(12) United States Patent
Hildreth

(10) Patent No.: US 8,539,357 B2
(45) Date of Patent: Sep. 17, 2013

(54) MEDIA PREFERENCES

(75) Inventor: Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 996 days.

(21) Appl. No.: 12/275,706

(22) Filed: Nov. 21, 2008

(65) Prior Publication Data

US 2009/0138805 A1 May 28, 2009

Related U.S. Application Data

(60) Provisional application No. 60/989,787, filed on Nov. 21, 2007, provisional application No. 61/080,475, filed on Jul. 14, 2008.

(51) Int. Cl.
*G06F 3/00* (2006.01)

(52) U.S. Cl.
USPC .......................................... 715/745; 715/733

(58) Field of Classification Search
USPC ............................................... 715/745, 733
See application file for complete search history.

(56) References Cited

U.S. PATENT DOCUMENTS

| | | | |
|---|---|---|---|
| 5,550,928 A | 8/1996 | Lu et al. | |
| 6,091,886 A | 7/2000 | Abecassis | |
| 6,772,192 B1 * | 8/2004 | Fulton et al. | 709/203 |
| 6,850,252 B1 * | 2/2005 | Hoffberg | 715/716 |
| 7,131,132 B1 | 10/2006 | Gehlot et al. | |
| 7,134,130 B1 * | 11/2006 | Thomas | 725/25 |
| 7,224,835 B2 * | 5/2007 | Maeda et al. | 382/218 |
| 7,260,823 B2 * | 8/2007 | Schlack et al. | 725/9 |
| 7,818,763 B2 | 10/2010 | Sie et al. | |
| 7,987,147 B2 * | 7/2011 | Ohtani et al. | 706/45 |
| 2002/0146168 A1 * | 10/2002 | Lee et al. | 382/165 |
| 2003/0072470 A1 * | 4/2003 | Lee | 382/103 |
| 2003/0227439 A1 * | 12/2003 | Lee et al. | 345/156 |
| 2003/0231788 A1 * | 12/2003 | Yukhin et al. | 382/115 |
| 2004/0117786 A1 * | 6/2004 | Kellerman et al. | 717/170 |
| 2004/0169587 A1 * | 9/2004 | Washington | 340/573.1 |
| 2006/0158307 A1 * | 7/2006 | Lee et al. | 340/5.53 |
| 2006/0170767 A1 * | 8/2006 | Brassil | 348/143 |
| 2006/0184800 A1 | 8/2006 | Rosenberg | |
| 2006/0204058 A1 * | 9/2006 | Kim et al. | 382/118 |
| 2007/0036398 A1 | 2/2007 | Chen | |

(Continued)

FOREIGN PATENT DOCUMENTS

| | | |
|---|---|---|
| CN | 1735150 A | 2/2006 |
| EP | 1887799 A1 | 2/2008 |

(Continued)

OTHER PUBLICATIONS

International Search Report and Written Opinion—PCT/US2008/084360—ISA/EPO—Feb. 4, 2009.

(Continued)

*Primary Examiner* — William Bashore
*Assistant Examiner* — Gregory A Distefano
(74) *Attorney, Agent, or Firm* — Kilpatrick Townsend & Stockton LLP

(57) ABSTRACT

An electronic media device may be controlled based on personalized media preferences of users experiencing content using the electronic media device. Users experiencing content using the electronic media device may be automatically identified and the electronic media device may be automatically controlled based on media preferences associated with the identified users.

28 Claims, 18 Drawing Sheets

(56) References Cited

U.S. PATENT DOCUMENTS

| | | |
|---|---|---|
| 2007/0140532 A1 | 6/2007 | Goffin |
| 2007/0220552 A1* | 9/2007 | Juster et al. ............. 725/46 |
| 2007/0236588 A1 | 10/2007 | Shibazaki |
| 2009/0133051 A1 | 5/2009 | Hildreth |
| 2009/0240355 A1* | 9/2009 | Buil et al. ............... 700/94 |

FOREIGN PATENT DOCUMENTS

| | | |
|---|---|---|
| JP | 2000175117 A | 6/2000 |
| JP | 2000322358 A | 11/2000 |
| JP | 2007096890 A | 4/2007 |
| JP | 2008182392 A | 8/2008 |
| WO | WO 0232136 A2 * | 4/2002 |
| WO | 2006120768 A1 | 11/2006 |

OTHER PUBLICATIONS

Mlakar, et al., "Viewer authentication for personalized iTV services," Eighth international Workshop on Image Analysis for Multimedia Interactive Services (WIAMIS'07), 2007, 4 pages.

* cited by examiner

| Viewer | Size | Facial Template | Body Model | AGE |
|---|---|---|---|---|
| Dad User | Size #1 | Facial Template #1 | Body Model #1 | 42 |
| Mom User | Size #2 | Facial Template #2 | Body Model #2 | 39 |
| Son User | Size #2 | Facial Template #3 | Body Model #3 | 15 |
| Daughter User | Size #3 | Facial Template #4 | Body Model #4 | 6 |
| Dog User | Size #3 | N/A | Body Model #5 | N/A |

FIG. 8

MEDIA PREFERENCES

CROSS REFERENCE TO RELATED APPLICATIONS

This application claims the benefit of U.S. Provisional Patent Application No. 60/989,787, filed Nov. 21, 2007, and U.S. Provisional Patent Application No. 61/080,475, filed Jul. 14, 2008, each of which is incorporated herein by reference in its entirety.

FIELD

The present disclosure generally relates to controlling electronic devices based on media preferences.

BACKGROUND

An electronic device may permit a user to change settings used to control the electronic device. Changing settings may allow the user to personalize the user's experience using the electronic device. However, changing settings and personalizing the user's experience may be limited and may be difficult for the user to control.

SUMMARY

According to a general implementation, a method includes determining an identity of a user detected within an image of an area proximate to an electronic media device. The method also includes accessing personalized media settings associated with the user based on the determined identity, and controlling the electronic media device based on the accessed personalized media settings.

Implementations may include one or more of the following features. For example, the method also may include receiving, at the electronic media device, a user input command, and accessing one or more images of an area proximate to the electronic media device in response to receiving the user input command. In this example, the identity of the user may be determined based on the one or more accessed images.

In some implementations, a favorite channel list maintained by the user may be accessed, a list of recordings maintained by the user may be accessed, and a song play list maintained by the user may be accessed. In these implementations, the electronic media device may be controlled to render a display of the favorite channel list maintained by the user on an electronic programming guide generated by the electronic media device, the electronic media device may be controlled to render a display of the list of recordings maintained by the user, and the electronic media device may be controlled to play songs based on the song play list maintained by the user. The personalized media settings may include DVR recordings, channels, songs, ratings, shows, themes, display settings, volume settings, and/or room lighting settings. The identity of the user detected within the image of the area proximate to the electronic media device may be determined by detecting multiple users in the image, detecting a position of a remote control in the image, identifying the user operating the remote control based on the detected multiple users and the detected position of the remote control, and determining an identity of the user operating the remote control.

In some examples, the method also may include registering one or more users by capturing one or more images of each of the one or more users, identifying one or more physical attributes of each of the one or more users based on the one or more captured images of each of the one or more users, and storing, in electronic storage, the identified one or more physical attributes of the one or more users. In these examples, the identity of the user detected within the image of the area proximate to the electronic media device may be determined by identifying one or more physical attributes of the user based on the image, accessing, from electronic storage, registration information related to the one or more registered users, and comparing the identified one or more physical attributes of the user to the accessed registration information. Based on the comparison, it may be determined whether the identified one or more physical attributes of the user match one or more physical attributes included in the registration information. In response to determining that the identified one or more physical attributes of the user match one or more physical attributes included in the registration information, the method further may include accessing, from the registration information, identification information corresponding to the matched one or more physical attributes. The registration information may include, for each of the one or more registered users, identification information stored in association with one or more physical attributes.

Registering the one or more users further may include receiving identification information associated with each of the one or more users, and storing, in electronic storage, the received identification information in association with the identified one or more physical attributes of the one or more users corresponding to the received identification information. One or more body attributes of the user may be identified, and the comparing and determining may be part of a body recognition process based on the one or more body attributes of the user. Also, one or more facial attributes of the user may be identified, and the comparing and determining may be part of a facial recognition process based on the one or more facial attributes of the user. In response to determining that the identified one or more physical attributes of the user do not match any of the one or more physical attributes included in the registration information, it may be determined that the user is a guest user and guest user media settings may be accessed.

In some implementations, the method also may include receiving a user input command that is related to media settings and that is provided by a user using a remote control, and accessing multiple images of one or more users, including the user using the remote control, proximate to the electronic media device when the user input command was received. The method further may include detecting a position of the remote control in the multiple images, determining a position of each of the one or more users in the multiple images, and comparing the position of the remote control to the position of each of the one or more users. The method may include detecting the user using the remote control, and determining an identity of the user using the remote control based on the one or more images. The method also may include associating the user input command with the identified user using the remote control when the user input command was received, and storing personalized media settings for the identified user using the remote control when the user input command was received based on the user input command. It may be determined that the user is the identified user using the remote control when the user input command was received, and the stored personalized media settings for the identified user using the remote control when the user input command was received may be accessed.

Detecting the position of the remote control in the multiple images may include detecting presence of infrared light in a first of the multiple images and detecting absence of infrared light in a second of the multiple images. Further, multiple images of multiple users may be accessed, and it may be determined which of the multiple users is closest to the position of the remote control. The user input command may be associated only with the identified user using the remote control when the user input command was received, and personalized media settings may be stored for only the identified user using the remote control when the user input command was received based on the user input command.

The user input command may be a user input command to perform an operation including at least one of recording a particular television program, adding a particular television channel as a favorite channel, and adding a particular song to a play list. The particular television program may be stored in a list of recordings associated with the user using the remote control when the user input command was received, the particular television channel may be stored in a list of favorite channels associated with the user using the remote control when the user input command was received, and the particular song may be stored in a play list associated with the user using the remote control when the user input command was received.

In some examples, multiple users may be detected in the image. In these examples, the method also includes determining an identity for at least one of the multiple users, accessing personalized media settings associated with each of the multiple users based on the determined identities of the multiple users, determining combined media settings based on the accessed personalized media settings associated with each of the multiple users, and controlling the electronic media device based on the combined media settings. Further, a list of media choices for each of the multiple users may be accessed, and a combined list of media choices maybe determined based on the lists of media choices for each of the multiple users. The combined list of media choices may include at least one of a combined favorite channels list, a combined recordings list, and a combined music play list.

The combined list of media choices may be determined by identifying media choices included on any one of the lists of media choices for each of the multiple users, and generating a combined list of media choices based on the identified media choices. Generating the combined list of media choices based on the identified media choices also may include identifying media choices marked as private, and excluding the media choices marked as private from the combined list of media choices. The combined list of media choices may be determined by identifying media choices included on all of the lists of media choices for each of the multiple users, and generating a combined list of media choices based on the identified media choices.

In further implementations, combined media settings based on the accessed personalized media settings associated with each of the multiple users may be determined by determining a position of each of the multiple users, and selecting a subset of the multiple users based on the determined positions of each of the multiple users. The subset of the multiple users may be less than all of the multiple users, and combined media settings may be determined based on the accessed personalized media settings associated with each of the users included in the subset of the multiple users without regard for the personalized media settings associated with the users that are included in the multiple users and that are not included in the subset of the multiple users.

In some arrangements, the method may include detecting a user entering an area proximate to the electronic media device based on the image, and triggering, without human intervention, the electronic media device to perform a personalized operation in response to detecting the user entering the area proximate to the electronic media device. In these arrangements, the method also may include triggering, without human intervention, the electronic media device to change a content channel currently being experienced to a personalized content channel associated with the detected user based on the accessed personalized media settings associated with the user. The identity of the user detected within the image of the area proximate to the electronic media device may be determined by identifying a region of interest within the image, detecting a user in the region of interest, and determining an identity of the detected user. The region of interest may be less than the entire image and may be a region in which users using the electronic media device are expected to be located.

According to another general implementation, a system includes a camera configured to capture one or more images of an area proximate to an electronic media device. The system also includes a processor configured to perform operations comprising determining an identity of a user detected within the one or more image of the area proximate to the electronic media device. The processor also is configured to perform operations comprising accessing personalized media settings associated with the user based on the determined identity, and controlling the electronic media device based on the accessed personalized media settings.

According to another general implementation, a computer readable storage medium has encoded thereon a computer program. The computer program includes instructions for determining an identity of a user detected within an image of an area proximate to an electronic media device. The computer program also includes instructions for accessing personalized media settings associated with the user based on the determined identity, and controlling the electronic media device based on the accessed personalized media settings.

According to another general implementation, a system includes a module configured to determine an identity of a user detected within an image of an area proximate to an electronic media device. The system also includes means for accessing personalized media settings associated with the user based on the determined identity, and means for controlling the electronic media device based on the accessed personalized media settings.

The details of one or more implementations are set forth in the accompanying drawings and the description, below. Other features and advantages of the disclosure will be apparent from the description and drawings, and from the claims.

BRIEF DESCRIPTION OF THE DRAWINGS

FIG. 8 depicts an example of data stored for registered users of an electronic device.

DETAILED DESCRIPTION

Figure 1:
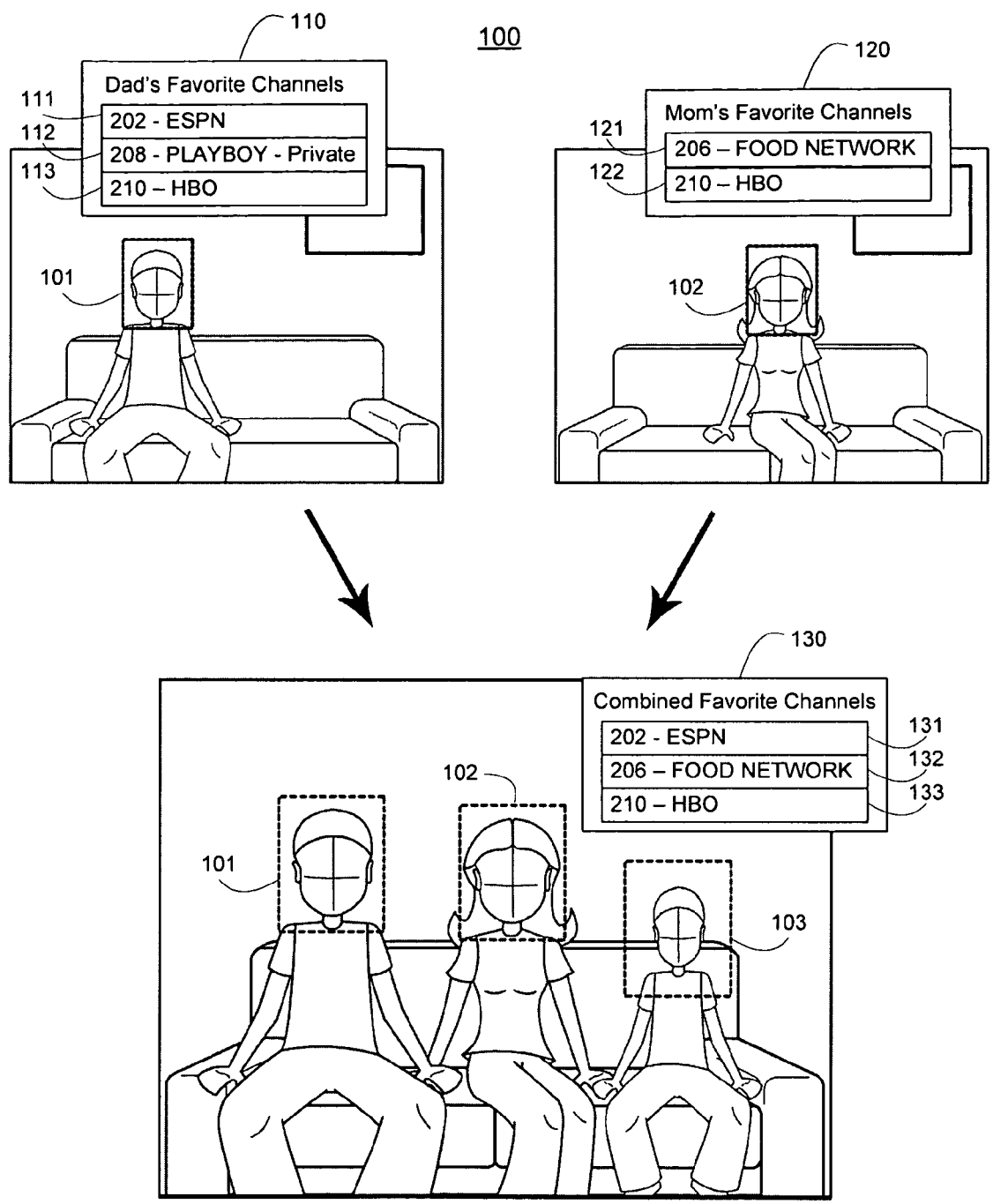
FIG. 1 is a contextual diagram demonstrating control of electronic devices based on media preferences.

An electronic media device may be controlled based on personalized media preferences of users experiencing content using the electronic media device. Personalized media preferences may include personalized/favorite channel lists, personalized recordings (e.g., digital television (DVR) recordings, music recordings, etc.), personalized song play lists, personalized device settings (e.g., volume settings, display settings, such as contrast, brightness, etc., language settings, theme settings, lighting settings, etc.), personalized functionality, or any other type of settings related to personalized content or personalized experience of content. The electronic media device may automatically identify users experiencing content using the electronic media device and automatically control the electronic media device based on media preferences associated with the identified users.

For example, a system may automatically provide personalized media preferences based on a detected user identity. The system may include one or more cameras that capture images of users experiencing media content. The camera images may be analyzed to detect users and determine an identity of the detected users using, for example, facial recognition. In response to identifying a user, media personalization rules associated with the identified user may be accessed and media content/settings may be automatically personalized for the identified user (e.g., a favorite television channel list is displayed for the identified user, DVR recordings specific to the identified user are displayed, etc.) based on the accessed media personalization rules. When multiple users are identified, content may be automatically personalized in a manner appropriate for the multiple users based on the media preferences of the multiple users (e.g., only songs common to play lists of each of the identified users are played, etc.).

In some implementations, engagement gestures may be used to determine when and to which user to personalize media settings. An engagement gesture may be a specific gesture, pose, or hand motion sequence performed by a user in front of a display. One example engagement gesture is a hand pose held in an upright position with all fingers and thumb spread apart widely. Another example is a circular hand motion made by extending the user's arm in front of their face, and moving their arm in a circle in front of their head. In essence, an engagement gesture specifies to the device that personalizes media settings that the user wishes to personalize media settings. To reduce errors, an engagement gesture may be an atypical gesture, such as a gesture that would not subconsciously be made with body language during an a normal conversation, or a gesture that would not be made in the ordinary performance of normal human activity.

In implementations in which engagement gestures are used, performance of the engagement gesture may trigger personalization of media settings such that media settings are not personalized until an engagement gesture is performed. In addition, when multiple users are present, media setting may be personalized for the user that performed the engagement gesture. For instance, in automatically applying personalized media settings, the settings associated with the user that performed the engagement gesture may be given priority to settings of other present users or may be applied without regard for settings of other present users.

FIG. 1 is a contextual diagram 100 demonstrating control of electronic devices based on media preferences. As shown, the contextual diagram 100 illustrates an example of controlling an electronic media device based on personalized channel lists. The contextual diagram 100 shows a dad user 101 experiencing content alone, a mom user 102 experiencing content alone, and the dad user 101 and the mom user 102 experiencing content together with a son user.

When the electronic media device detects the dad user 101 as experiencing content alone, the device displays a favorite channels list 110 associated with the dad user 101. For example, the dad user 101 may be watching television alone and the device rendering the television content may automatically, without human intervention, identify the dad user 101 as the user watching the television content based on one or more images of an area proximate to the device. In response to identifying the dad user 101 as the user watching the television content, the device controls operations associated with viewing television content based on media preferences associated with the dad user 101.

For instance, after identifying the dad user 101 as being the sole user currently experiencing television content and receiving a command or other input that causes a display of a channel list (e.g., a display television guide input command), the device displays the dad user's favorite channels list 110. As shown, the dad user's favorite channels list 110 includes three channels 111-113. Each of the channels is identified by a numerical channel number and a channel name identification. The dad user 101 may be able to change the names or display properties (e.g., size, shape, theme, etc.) of the channels in the channel listing and store the changes as personalized media preferences such that the device displays the channel listing in a manner selected by the dad user 101 when the device detects the dad user 101 experiencing television content. Although three channels are shown for illustrative purposes, the dad user's favorite channels list 110 may include more, and perhaps many more, or fewer channels.

The dad user's favorite channels list 110 includes channels 111 and 113 as regular channels and channel 112 as a private channel. A private channel may be a channel that is displayed in the dad user's favorite channels list 110 only when the dad user 101 is detected as watching television alone or only when the dad user 101 is detected as watching television with other approved users (e.g., other users above 18 years in age, other male users above 18 years in age, or other users or types of users (e.g., guest users of a particular age) selected by the dad user 101 and stored as approved users). The regular channels 111 and 113 may be included the dad user's favorite channels list 110 at all times, regardless of which other users are watching television with the dad user 101.

The dad user's favorite channels list 110 may include channels previously selected by the dad user 101 and stored, in electronic storage, as favorite channels of the dad user 101. For instance, as the dad user 101 views television programming, the dad user may add or delete channels from the dad user's favorite channels list 110. Adding or deleting channels may update a favorite channels list stored for the dad user 101. The device may automatically use the stored favorite channels list as the list of channels displayed when the dad user 101 is detected as watching television.

The dad user's favorite channels list 110 also may include channels automatically selected by the device rendering the television content. For instance, the device may automatically select channels based on demographic or preference information known about the dad user 101. The dad user 101 may input the demographic or preference information or the device may infer the demographic or preference information based on the physical attributes of the dad user 101 (e.g., size, facial features, etc.) or past viewing behavior by the dad user 101 (e.g., past channels viewed by the dad user 101). The device may store the demographic or preference information in a user profile for the dad user 101 and may use the user profile data to generate a favorite channels list for the dad user 101 (e.g., by selecting channels popular to users having demographic or preference information similar to the dad user 101).

When the electronic media device detects the mom user 102 as experiencing content alone, the device displays a favorite channels list 120 associated with the mom user 102. For example, the mom user 102 may be watching television alone and the device rendering the television content may automatically, without human intervention, identify the mom user 102 as the user watching the television content based on one or more images of an area proximate to the device. In response to identifying the mom user 102 as the user watching the television content, the device controls operations associated with viewing television content based on media preferences associated with the mom user 102. The device also may prevent the mom user 102 from viewing personalized media preferences of other users.

The mom user's favorite channels list 120 includes two channels 121 and 122. As shown, the mom user's favorite channels list 120 is different than the dad user's favorite channels list 110. Specifically, the mom user's favorite channels list 120 includes a channel that is included in the dad user's favorite channels list 110, includes a channel that is not included in the dad user's favorite channels list 110, and omits channels that are included in the dad user's favorite channels list 110. The mom user's favorite channel list 120 may be generated and displayed to the mom user 102 using techniques similar to those described above with respect to the dad user's favorite channels list 110.

When the dad user 101 and the mom user 102 are experiencing (e.g., viewing) content together, the device displays a combined favorite channels list 130 that is based on media preferences (e.g., stored favorite channels lists) for both the dad user 101 and the mom user 102. As shown, the combined favorite channels list 130 includes channels from both the dad user's favorite channel list 110 and the mom user's favorite channels list 120. In particular, channel 131 (i.e., channel 202—ESPN) corresponds to channel 111 on the dad user's favorite channel list 110, channel 132 (i.e., channel 206—FOOD NETWORK) corresponds to channel 121 on the mom user's favorite channel list 120, and channel 133 (i.e., channel 210—HBO) corresponds to both channel 113 on the dad user's favorite channel list 110 and channel 122 on the mom user's favorite channel list 120. When multiple users are identified, the device may generate a combined favorite channels list 130 based on the favorite channel lists of all or some identified users experiencing the television content to provide a television viewing experience that is based on the collective preference of the identified users.

The combined favorite channels list 130 may not include channels marked as private by one of the users. For example, the dad user's favorite channel list 110 includes channel 112 (i.e., channel 208—PLAYBOY) marked as private. When the device identifies the dad user 101 as watching television alone, the channel 112 is included in the displayed list of channels and is made available for user selection. However, when the device identifies the dad user 101 as watching television with other users (e.g., the mom user 102), the channel 112 is not included in the displayed list of channels and is not made available for user selection. In some implementations, the channel 112 (i.e., channel 208—PLAYBOY) may be displayed when only the mom user 102 and dad user 101 are watching television together, but not when the mom user 102 and dad user 101 are watching television with the son user 103.

Other implementations may use different processes for selecting which channels to include in the combined list of favorite channels. For instance, if possible, the combined list of favorite channels may include the channels that are included on the favorite channels lists of all of the identified users currently watching television. Applying this technique to the example shown in FIG. 1, the combined favorite channels list 130 would only include the channel 133 (i.e., channel 210—HBO) because that is the only channel included on both the dad user's favorite channel list 110 and the mom user's favorite channel list 120.

In FIG. 1, a son user 103 is also shown as watching television with the dad user 101 and the mom user 102. Although not shown, the son user's media preferences may be taken into account in generating the combined list of favorite channels. However, if the son user 103 does not have a stored favorite channels list or if the son user 103 is not a registered user available for identification by the device, the device may not account for the presence of the son user 103 in generating the combined favorite channels list 130. Alternatively, if the son user 103 does not have a stored favorite channels list or if the son user 103 is not a registered user available for identification by the device, the device may account for the son user 103 by ensuring that the combined list of favorite channels includes channels suitable for someone with demographic (e.g., age) characteristics detected for the son user 103. For instance, the device may eliminate channels that would not be appropriate for the son user 103 (e.g., the channel 112 included in the dad user's favorite channel list 110) or add channels that are likely to be of interest to the son user 103. If the son user 103 is not a registered user available for identification by the device, the device may eliminate channels that the dad user 101 or the mom user 102 have classified as private.

As illustrated in FIG. 1, a device rendering the television content may automatically, without human intervention, be controlled to personalize/customize a listing of channels displayed to a user by determining an identity of the user currently experiencing television content. In this regard, when the dad user 101 is watching television alone and provides an input command to display a television channel listing (e.g., an electronic programming guide), the television channel listing is automatically displayed as the dad user's favorite channels list 110. Alternatively, when the mom user 102 is watching television alone and provides an input command to display a television channel listing (e.g., an electronic programming guide), the television channel listing is automatically displayed as the mom user's favorite channels list 120. Finally, when the dad user 101 and the mom user 102 are watching television together and one of them provides an input command to display a television channel listing (e.g., an electronic programming guide), a combined television channel listing is automatically generated based on the dad user's favorite channels list 110 and the mom user's favorite channels list 120 and displayed as the television channel listing.

In some examples, media preferences may be controlled by a remote, third party device such that the media preferences associated with the dad user 101 and the mom user 102 may be applied on several media device used by the dad user 101 and the mom user 102. This may allow the dad user 101 and the mom user 102 to establish or change personalized media preferences for several devices used by the dad user 101 and the mom user 102 without having to establish or change personalized preferences for each device. The remote, third party device may communicate with any type of media device and be allowed to control the media settings of any type of media device. In these examples, the dad user 101 and the mom user 102 may establish personalized media settings with the remote, third party device on a per-device basis such that the media preferences of the dad user 101 and the mom user 102 may vary based on the device being used.

Viewing habits of the dad user 101 and the mom user 102 further may be transmitted over a network to a third party. The viewing habits may be used by the third party to suggest customized media settings for the dad user 101 and the mom user 102 based on the viewing habits. The customized media settings may be automatically applied without interaction with the dad user 101 and the mom user 102 or may be presented to the dad user 101 and the mom user 102 for consideration and either accepted or denied. The third party may use the viewing habits for other purposes (e.g., advertisement targeting, media tracking, etc.).

Figure 2:
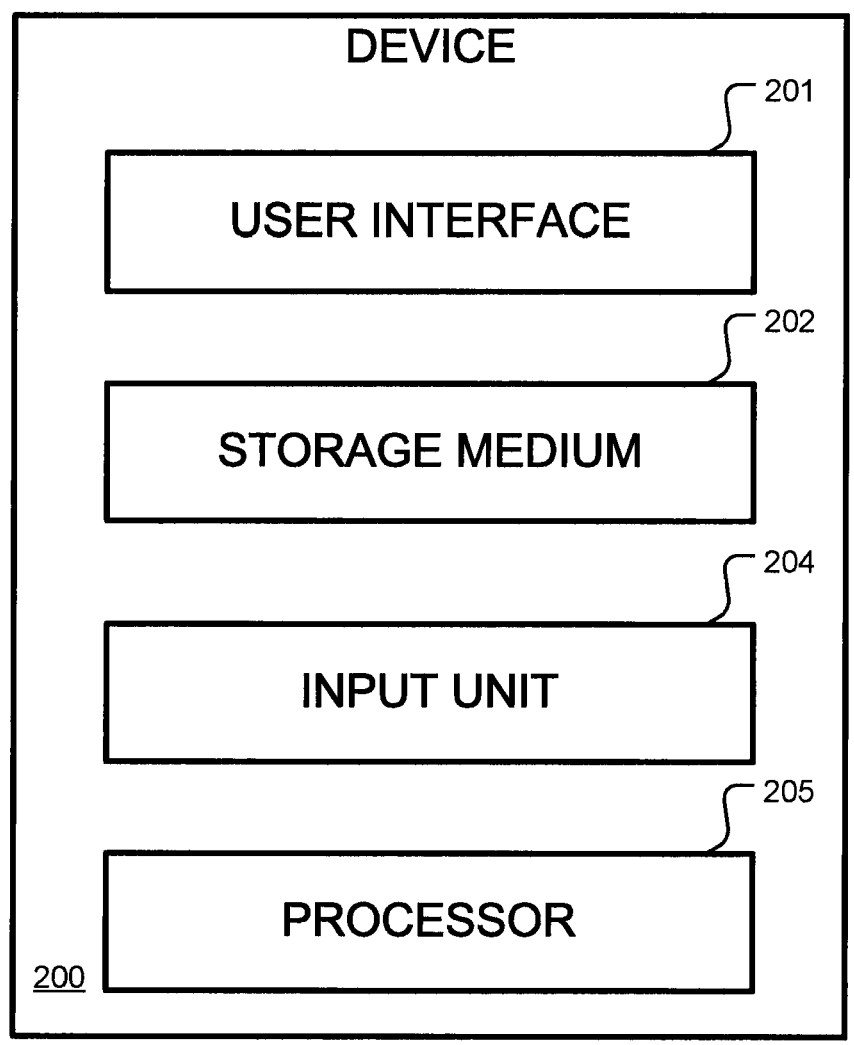
FIG. 2 is a block diagram of an exemplary device.

FIG. 2 is a block diagram of a device 200 used to implement media preferences control. Briefly, the device 200 includes, among other things, a user interface 201, a storage medium 202, an input unit 204, and a processor 205.

The user interface 201 is a mechanism for allowing a user to interact with the device, or with applications invoked by the device. The user interface 201 may effect both input and output, allowing a user to manipulate the device or for the device to produce the effects of the user's manipulation. The device 200 may utilize any type of user interface 201, such as a graphical user interface (GUI), a voice user interface, or a tactile user interface.

The user interface 201 may be configured to render a visual display image. For example, the user interface 201 may be a monitor, a television, a liquid crystal display (LCD), a plasma display device, a projector with a projector screen, an auto-stereoscopic display, a cathode ray tube (CRT) display, a digital light processing (DLP) display, an organic light-emitting diode (OLED) display, or any other type of display device configured to render a display image. The user interface 201 may include one or more display devices. In some configurations, the user interface 201 may be configured to display images associated with an application, such as display images generated by an application, including an object such as an avatar. The user interface 201 also may be configured to display television content or other video/media content.

The storage medium 202 stores and records information or data, and may be an optical storage medium, magnetic storage medium, flash memory, or any other storage medium type. The storage medium 202 may store personalized media settings, data used to identify registered users, and recorded or other media content available for display by the device 200.

The input unit 204 is a hardware mechanism that transforms physical inputs into commands that may be used by the device, such as a keyboard or keypad, mouse, trackball, touchpad, joystick, handheld remote control, camera, or other sensor. In certain implementations, such as where the device 201 uses a touch screen, the functionality of the user interface 201 and the input unit 204 may be combined. The input unit 204 also may be a handheld remote control manipulated by a user to control the device 200.

The device 200 is electrically connected, over a wireline or wireless pathway, to the input unit 204 and the user interface 201, and is configured to control the operation of the processor 205 to provide for control of the device 200. In one configuration, the device 200 uses the processor 205 or other control circuitry to execute an application that controls the device 200 based on media preferences of users identified as experiencing media content. The device 200 may be implemented as a set top box, a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, an electronic media player (e.g., a digital video disc (DVD) player, a compact disc (CD) player, a digital video recorder (DVR)), or any other type of electronic device that includes a processor or other control circuitry configured to execute instructions, or any other apparatus that includes a user interface.

Figure 3:
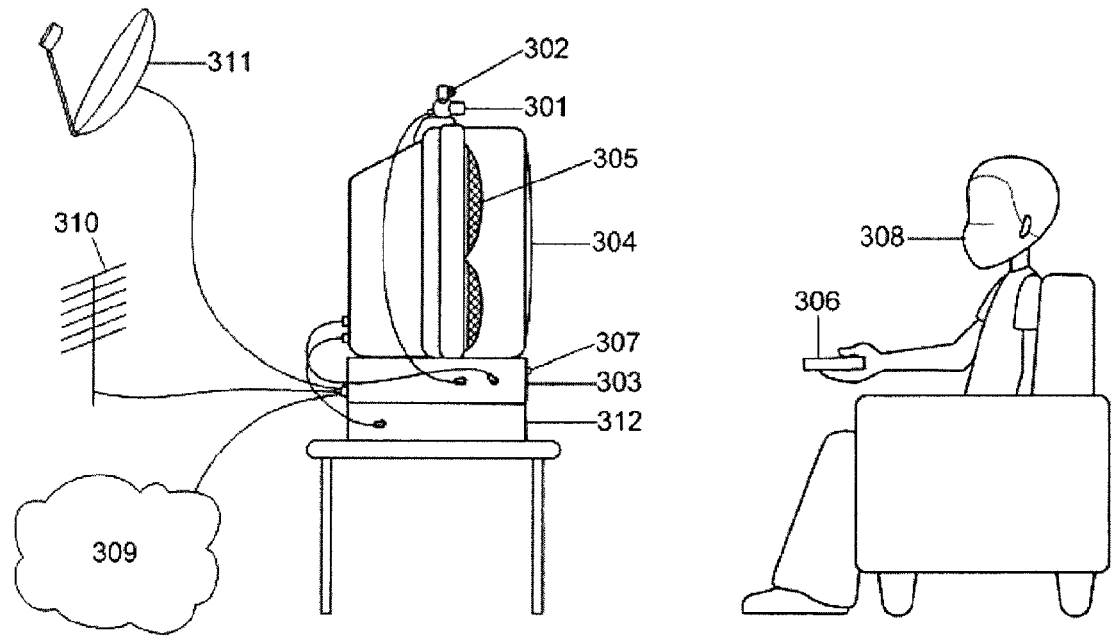
FIG. 3 illustrates an example of a system configured to control an electronic device based on media preferences.

FIG. 3 illustrates an example of a system configured to control an electronic device based on media preferences. The system includes a camera 301, an infrared emitter 302, a processor 303, a display device 304, audio speakers 305, a hand-held remote control 306, an infrared receiver 307 capable of receiving and decoding infrared signals, a network 309, an antenna 310, a satellite dish 311, and an optical disk player (e.g., DVD player) 312. One or more users 308 may attempt to view video content and the system may control the display of video content based on media preferences of the one or more users 308.

The camera 301 may include a color video camera, an infrared-sensitive camera and infrared emitter 302 operable to sense a user in low ambient light, a stereo camera operable to generate a depth measurement, a time-of-flight camera including an emitter operable to generate a depth measurement, or any other type of optical sensor. In some configurations, the camera 301 and emitter 302 may be incorporated into or otherwise affixed to the bezel of a television, monitor, or other electronic device. In some configurations, the camera 301 and emitter 302 may be positioned around a room so that the field of view of the camera (or multiple cameras) observe the entire room.

The processor 303 may be included in a television receiver, a personal computer, a Digital Versatile Disc or Digital Video Disc (DVD) player, a video game console, or another type of device. The processor 303 may be included in any type of electronic device and may operate in combination with multiple processors and/or multiple electronic devices.

The display device 304 may be operable to display a video program. The display device 304 also may display graphics generated by the processor 303. The display device 304 may include a television, a projector, a computer monitor, or any other type of display device. For instance, the display device 304 may be included in a portable electronic device to display content.

The audio speakers 305 are operable to produce sound. The audio speakers 305 may be part of the display device 304 or may be separate from the display device 304. In some configurations, speakers may include headphones.

Further, a hand-held remote control 306 may be operable to transmit commands to the processor 303. An example of a remote control is described below with respect to FIG. 4. A remote control 306 may include buttons, and transmit commands by emitting an infrared signal when a button is pressed. A command may have multiple functions depending on the context of the system. The system may include an infrared receiver 307 capable of receiving and decoding infrared signals (e.g., infrared signals emitted from the remote control 306). The remote control 306 also may include an light emitting diode (LED) or other illumination source to facilitate detection of the remote control 306 in a camera image. Further, the remote control 306 may have at least a portion that is an identifiable color or has an identifiable pattern that may facilitate detection of the remote control 306 in a camera image.

The one or more users 308 may watch the image displayed on the display device 304 and listen to the sound produced by the speakers 305. A camera 301 may be oriented and focused such that all or some of the users 308 are within the camera's field of view.

The camera 301 captures or otherwise produces camera images, which may be transmitted to the processor 303. The processor 303 may process the camera images using techniques described throughout this disclosure. The processor 303 may receive and decode content descriptor tags embedded within video program data. The processor 303 may control the video being displayed on the display device 304 and also may control the audio being played though the speakers 305 based on media preferences and the decoded content descriptor tags. The processor 303 also may generate computer graphics for rendering on the display device 304.

The processor 303 may be connected to a network 309, an antennae 310, a satellite dish 311, an optical disk player (e.g., DVD player) 312, or other devices used to receive/render video and audio content. The processor 303 further may be connected to a recording device (e.g., a personal video recorder, a video tape recorder, a DVD recorder, a digital video recorder (DVR), etc.) capable of recording video and audio program material.

Figure 4:
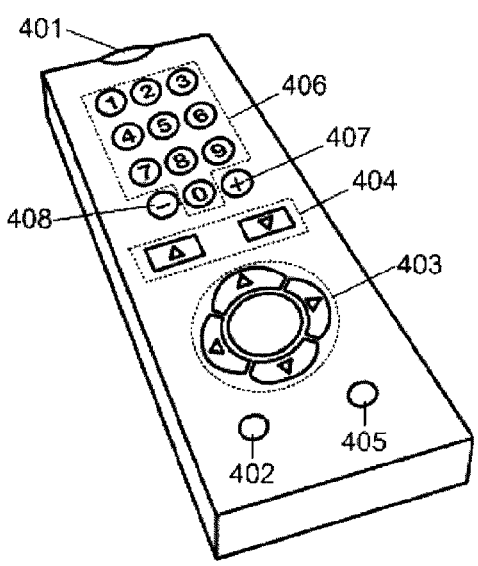
FIG. 4 illustrates an example of a remote control.

FIG. 4 illustrates an example of a remote control (e.g., remote control 306 shown in FIG. 3). The remote control includes an infrared emitter 401 that transmits control data using an infrared signal. As described in more detail below, an electronic device may identify the position of the remote control by analyzing camera images that include light generated from the remote control's infrared emitter 401. In some implementations, the remote control does not require additional hardware to be compatible with a system that controls an electronic device based on media preferences using a detected position of the remote control. Also, the remote control may be a universal or a programmable remote control.

The remote control may include a button 402 so that a user may directly access or initiate a configuration process. Alternatively, a user may access a configuration process as an option of the device's setup menu. The configuration process, described in more detail below, enables registration of known/authorized users such that media preferences may be stored for registered users and automatically applied when the system detects the registered users.

The remote control also includes directional buttons 203 that allow a user to navigate through a user interface and select an interface control. For instance, during a configuration process, a user may navigate through different facial images using the directional buttons 403 and select an image that corresponds to the user's face. A user also may use the directional buttons 403 to navigate a programming guide, a list of recordings, media settings, menu options, or other interface control options used to control and establish settings of an electronic media device.

The remote control further may include buttons 404 that enable a user to control various aspects of an electronic device. For example, the buttons 404 may be used to change a channel of an electronic device rendering a display of television programming or may be used to cycle through displayed options for controlling the electronic device.

The remote control may include a button 405 that directly overrides the system's media preferences settings and restores the device to default settings. The remote control may include numerical input buttons 406 that allow a user to provide numerical input to the electronic device controlled by the remote control. For instance, a user may directly type in a channel number using the numerical input buttons 406 to change a channel being tuned by the electronic device.

Buttons 407 or 408 may allow a user to control personalized media preferences. For example, a user may use the buttons 407 and 408 to add or delete a channel from the user's personalized favorite channels list and/or to add or remove a program to a personalized list of recorded programs for the user.

Figure 5:
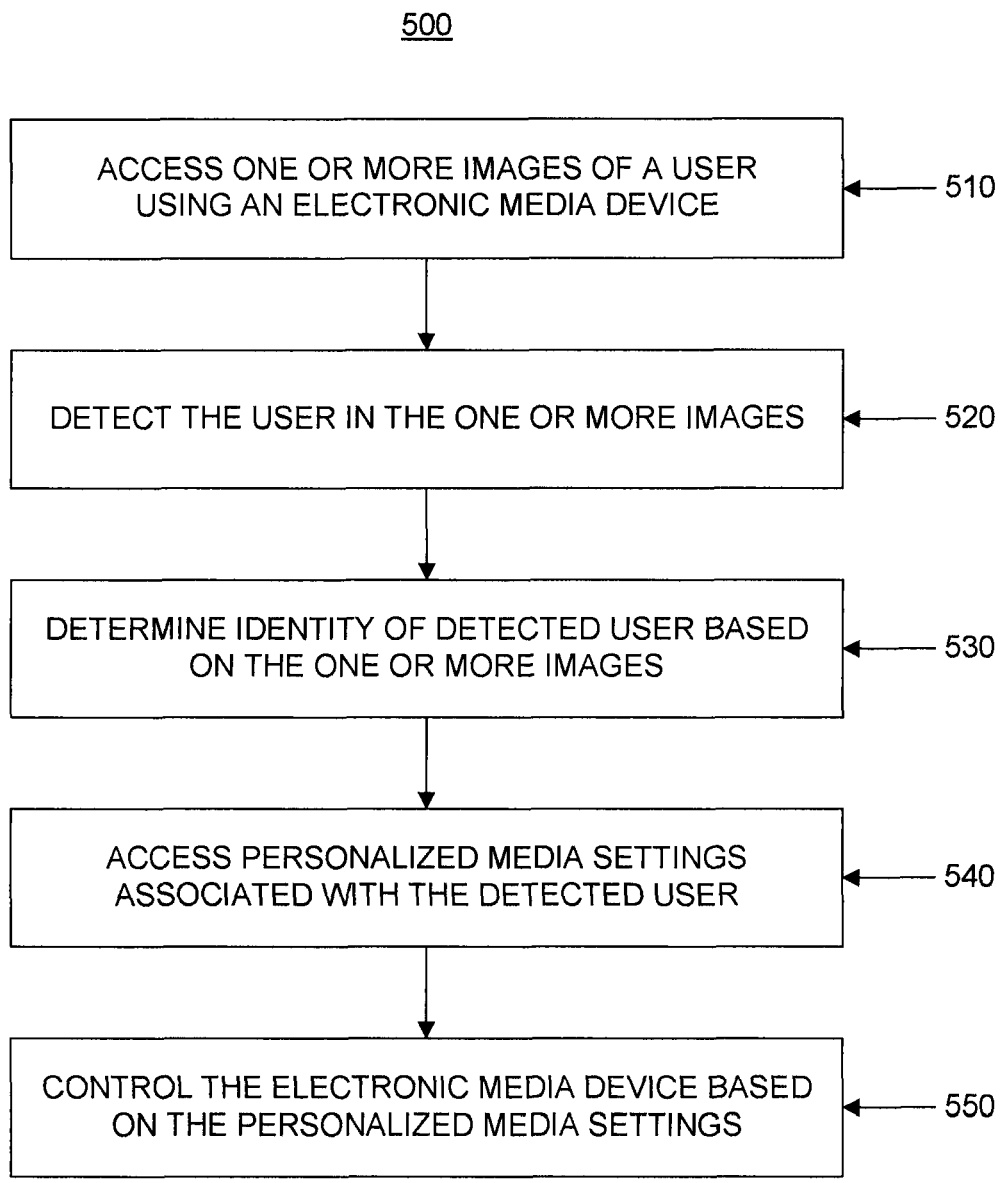
FIGS. 5, 7, 9, 13, and 16 are flowcharts of exemplary processes.

FIG. 5 illustrates a process 500 for controlling an electronic media device based on personalized media settings. For convenience, particular components described with respect to FIG. 2 are referenced as performing the process 500. However, similar methodologies may be applied in other implementations where different components are used to define the structure of the system (e.g., components described with respect to FIG. 3), or where the functionality is distributed differently among the components.

The processor 205 accesses one or more images of a user using the electronic device 200 (510). For example, the processor 205 may receive one or more images from one or more cameras capturing images of an area proximate to the electronic device 200. The processor 205 also may access one or images of a user using the electronic device 200 from the storage medium 202. The processor 205 may continuously access images of an area proximate to the device 200 or may access images of an area proximate to the device 200 in response to input commands received using the input unit 204.

The processor 205 detects a user in the one or more images (520). For example, the processor 205 may process or analyze the accessed images to detect a user's face or body in the accessed images. In this example, the processor may detect a user by comparing features in the accessed images to typical features of users in images or may detect a user by detecting motion in the accessed images. The processor 205 also may detect a user based on skin color analysis of the accessed images or may detect a user by comparing current images including one or more users with a background model to detect differences between the current images and the background model. The processor 205 may use any type of technique to detect a user within a single image or within a set of multiple images of the user.

In some implementations, the processor 205 may detect users using a face detection process. The face detection process may automatically detect faces of users within one or more camera images, and may determine the location, size, or other physical characteristics of human faces within the one or more camera images.

The face detection process may include analyzing features. Analyzing features may include identifying features (e.g., edges or gradients) within one or more camera images, and identifying a set of features that may correspond to a face. A set of features may be determined to correspond to a face where the arrangement (e.g., shape) is consistent with that of a human face. For instance, a collection of features may be identified as a face if an outline or shape of the collection of features is similar to a head with shoulders below the head.

The face detection process also may include analyzing color. Analyzing color may include comparing camera images to a color model, identifying parts of the camera image that have colors consistent with human skin and facial features, clustering those parts of the camera image having colors consistent with human skin and facial features, and classifying a cluster as a face if it meets a set of size and shape criteria.

The face detection process further may include filtering faces, in order to avoid detecting faces that do not correspond to a user (e.g., a face appearing in a photograph). Faces may be filtered based on a size criteria, whereby faces are excluded if they are smaller than a predefined size threshold. Faces also may be filtered based on a motion criteria, whereby faces are excluded if they remain motionless for longer than a predefined duration threshold. In systems where the camera capturing the accessed images is capable of detecting range or depth (e.g., a stereo camera or a time-of-flight camera), faces may be filtered based on a shape criteria, whereby faces are excluded if they are flat.

In some arrangements, the processor 205 may detect users using a body detection process. The processor 205 may implement a body detection process, where the body detection process continuously monitors the accessed camera images to detect users by detecting parts of the accessed camera images that are inconsistent with a background model. Parts of the camera image inconsistent with a background model may include a user's body.

In a body detection process, a background model may include a range of color values representing a background, for each part (e.g., pixel) of a background image. A color background model may be used where the system includes a camera capable of acquiring color images. A background model also may include a range of luminance values representing a background, for each part (e.g., pixel) of a background image. A luminance background model may be used where the system includes a camera capable of acquiring infrared images.

In another implementation of a body detection process, a background model may include a range of distance measurements representing a background, for each part (e.g., pixel) of a background. A distance measurement may offer a benefit over color and luminance measurements, in that a distance rarely changes (e.g., unless furniture is moved the distance does not change). A distance measurement may be acquired by a camera capable of determining range or depth (e.g., a stereo camera or a time-of-flight camera). An example of a time-of-flight camera includes that produced by Canesta, whereby an infrared emitter emits a pulse of infrared light, and an optical sensor measures the time the light takes to travel to an object and back to the camera. The time-of-flight camera calculates the distance of the object based on the measured time. An example of a stereo camera includes that produced by Tyzx, whereby a stereo camera includes multiple optical sensors that capture images of a scene from multiple viewpoints, and compares the multiple images to determine the disparity in the position of objects between the multiple viewpoints. The stereo camera calculates a distance of the object based on the determined disparity.

The body detection process may acquire a background model by sampling a representation of a scene without a user. A representation of the background may include a color measurement, luminance measurement, or distance measurement for parts (e.g., pixels) of a camera image. A measurement may include a range of values.

The body detection process also may implement a dynamic background model process which updates a background model to account for changes in a scene. A dynamic background model process may include a buffer capable of storing n representations of a background. Initially, all n samples may be filled with a representation of a scene. A sampling process may sample camera data at regular intervals of time (e.g., a sampling rate r). Each sample may be added to the background model, replacing the oldest sample. Therefore, a background model buffer may store the most recent n samples of a scene, which may represent the scene during a span of time, t, according to equation (1):

$$t = \frac{n}{r} \tag{1}$$

The span of time t may be longer than a user may be expected to sit in front of the display device (e.g., several days). Where a representation of the background may include a color or luminance measurement, a buffer may store several representations for each time of day, so that the system accommodates changes in ambient lighting that occur throughout the day. For example, t may be seven days and r may be one hour, so that the system acquires a sample every hour of every day and stores one week's worth of data.

A dynamic background model process also may include a selection process that selects a value for each part (e.g., pixel) of an image, where that value may represent the background. A selection process may select a typical value. Selecting a typical value may include selecting a median value. A median value may accurately represent a background if a user is absent from at least half of all the samples.

In an implementation where a representation of the background includes a color or luminance measurement, a selection process may calculate a typical value of all samples stored in the history buffer acquired at the same time of day. In another implementation where a representation of the background may include a color or luminance measurement, a selection process may normalize all samples stored in the history buffer to reduce the effects of ambient light levels that may change throughout the day. In an implementation where a representation of the background may include a distance measurement, a selection process may calculate a typical value of all samples in the history buffer, since the distance does not change according to time of day.

The body detection process may compare one or more camera images to a background model. The body detection process may compare a current camera measurement (e.g., color, luminance, or distance) with a corresponding selected background model measurement. A body detection process may classify each part (e.g., pixel) as foreground if the difference between the current camera measurement and corresponding selected background model measurement is greater than a threshold, and classify each part (e.g., pixel) as background if the difference between the current camera measurement and corresponding selected background model measurement is less than a threshold. For example, in implementations where a measurement includes a distance, a user may be detected because the distance to the user's body may be shorter than the distance to the background (e.g., the couch the user is sitting on).

A body detection process further may include a clustering process. A clustering process may select parts classified as foreground that may correspond to a user. Therefore, a clustering process may determine the number of users, and the size and position of each user.

The clustering process may be used to fit a three dimensional model of a human body to match the three dimensional shape of a user. A camera distance measurement may represent the front surface of a user (e.g., a time-of-flight camera can measure the front of a user, but may not be able to measure the back of a user). Fitting a three dimensional model of a human body to the three dimensional shape of a user may include fitting a surface of a three dimensional model of a human body to a surface of a shape of a user. A back surface of a user may be assumed to be bounded by a background model.

Fitting a three dimensional model of a human body to the three dimensional shape of a user further may include fitting a volume of a three dimensional model of a human body to a volume defined by the difference between a camera distance measurement and a background distance measurement. A volume defined by the difference may be dilated to account for a portion of a user that may exist behind the background model surface (e.g., the part of a user that sinks into soft couch cushions). Fitting a three dimensional surface and volume may utilize a gradient process, which may find a configuration of a model of a user that optimally fits camera data. A configuration of a model of a user may include an arrangement and scale of body components.

After detecting a user, the processor 205 determines an identity of the detected user based on the one or more images (530). For example, the processor 205 may identify the user using a facial recognition or body recognition process. In this example, the processor 205 may compare features of the detected user's face or body with features of faces or bodies of registered or otherwise known users. Based on the comparison, the processor 205 may determine the identity of the detected user if a match is found.

To determine an identity of a detected user, the processor 205 may implement a user identification process that automatically identifies users detected within one or more camera images (e.g., all of the users detected in the user detection process described above). The identity of particular users may be determined based on the appearance of a user's face within the one or more camera images. For example, the processor 205 may analyze images captured by a camera to detect a face of a user located in front of the camera. After detecting a user's face, the processor 205 then may analyze the detected face to determine whether the detected face belongs to an identifiable or known user.

The processor 205 may implement a face identification process to identify faces within a camera image. The face identification process may include selecting a part of an image where a face is detected, and comparing the selected part of the image to a template. The storage medium 202 may include stored templates of users. For instance, the device 200 may store templates of users for comparison to detected users in an identification process. The templates may be generated in a configuration/registration process using techniques described in more detail below.

The face identification process may include using an eigenimage process. An eigenimage face recognition process may include selecting a part of an image where a face is detected, calculating a covariance matrix, and calculating the eigenvectors and eigenvalues of the covariance matrix. The eigenimage face recognition process also may include performing principal component analysis to select the principal components and reduce the dimensionality of the eigenvectors and eigenvalues, and comparing the resulting eigenimage data to a predefined eigenimage data set to generate a set of similarity measurements between the detected face and the faces in the predefined eigenimage data set. Based on the comparison, a statistical analysis may be performed to classify the eigenimage as a user's face. The statistical analysis may utilize data generated during a training process that may be performed in a configuration or registration process using techniques described in more detail below.

The face identification process also may include a Pseudo 2-D Hidden Markov Chain (P2HMM) face recognition process. A Pseudo 2-D Hidden Markov Chain (P2HMM) face recognition process may include modeling a face with a set of hidden Markov states. Hidden Markov states may be arranged in rows and columns. A Pseudo 2-D Hidden Markov Chain (P2HMM) face recognition process further may include fitting a face into a set of P2HMM models, calculating a likelihood of the face being from a model, and selecting the model of largest likelihood. A set of P2HMM models may utilize data generated during a training process that may be performed in a configuration/registration process using techniques described in more detail below.

The face identification process also may utilize the Viola-Jones face detection process. The Viola-Jones face detection process may be used for detected faces that are facing the camera. Other detected faces at bad angles may be filtered out prior to performing the face identification process.

Where a range or depth camera (e.g., a stereo camera or a time-of-flight camera) is used, the face identification process may include using a three-dimensional face recognition process. A three-dimensional face recognition process may include selecting a part of an image where a face is detected, generating a three-dimensional model (e.g., mesh data) and texture model of the detected face, and comparing the three-dimensional model and texture model to templates of users. The templates may be generated in a configuration/registration process using techniques described in more detail below.

The processor 205 also may determine the identity of particular users based on analysis of a user's body in the images. In some implementations, the processor 205 may implement a body identification process to determine the size of a user's body. The size of a user's body may be sufficient to determine a user's identity if a set of possible users is sufficiently small (e.g., where a set of possible users represents members of a family). A body identification process may compare a configuration of a model of a detected user to stored measurements of registered users. A registered user having the closest match (e.g., most similar size) may be selected to determine the identity of a user.

In response to determining the identity of the detected user, the processor 205 accesses personalized media settings associated with the detected user (540). For instance, the processor 205 may access personalized media settings associated with the detected user from the storage medium 202. The processor 205 also may access personalized media settings associated with the detected user by receiving an electronic communication over a network or from another device. The personalized media settings may include personalized/favorite channel lists, personalized recordings (e.g., digital television (DVR) recordings, music recordings, etc.), personalized song play lists, personalized device settings (e.g., volume settings, display settings, such as contrast, brightness, etc., language settings, theme settings, lighting settings, etc.), or any other type of settings related to personalized content or personalized experience of content.

The processor 205 controls the electronic media device 200 based on the accessed personalized media settings (550). For instance, the processor 205 may control the electronic media device 200 to apply the personalized media settings automatically without human intervention. Accordingly, when a user chooses to experience content using the electronic device 200, the preferred media settings of the user are automatically applied without the user having to provide input to identify themselves, request application of their personalized settings, or manually modify settings of the electronic media device.

In some implementations, when the personalized media settings include a favorite channels listing, the processor 205 controls the electronic media device 200 to, when displaying a channel listing, display the favorite channels listing, which is different than a default channel listing and specific to the detected user. In addition, when the personalized media settings include personalized recordings, the processor 205 controls the electronic media device 200 to display a recorded content listing based on the personalized recordings, which are different from recordings of other users and specific to the detected user.

In implementations in which the personalized media settings include device settings, the processor 205 automatically changes the settings of the electronic media device 200 to match the personalized settings. For instance, when the processor 205 identifies a particular user (e.g., when the particular user sits in front of a television), the processor 205 automatically adjusts the device settings to provide a content experience preferred by the particular user. To provide a content experience preferred by the particular user, the processor 205 may adjust the volume of a speaker, adjust display settings of a display device (e.g., contrast settings, brightness settings, display format, etc.), and may adjust lighting options (or other physical properties, such as temperature) in a room in which the device 200 is located.

Figure 6:
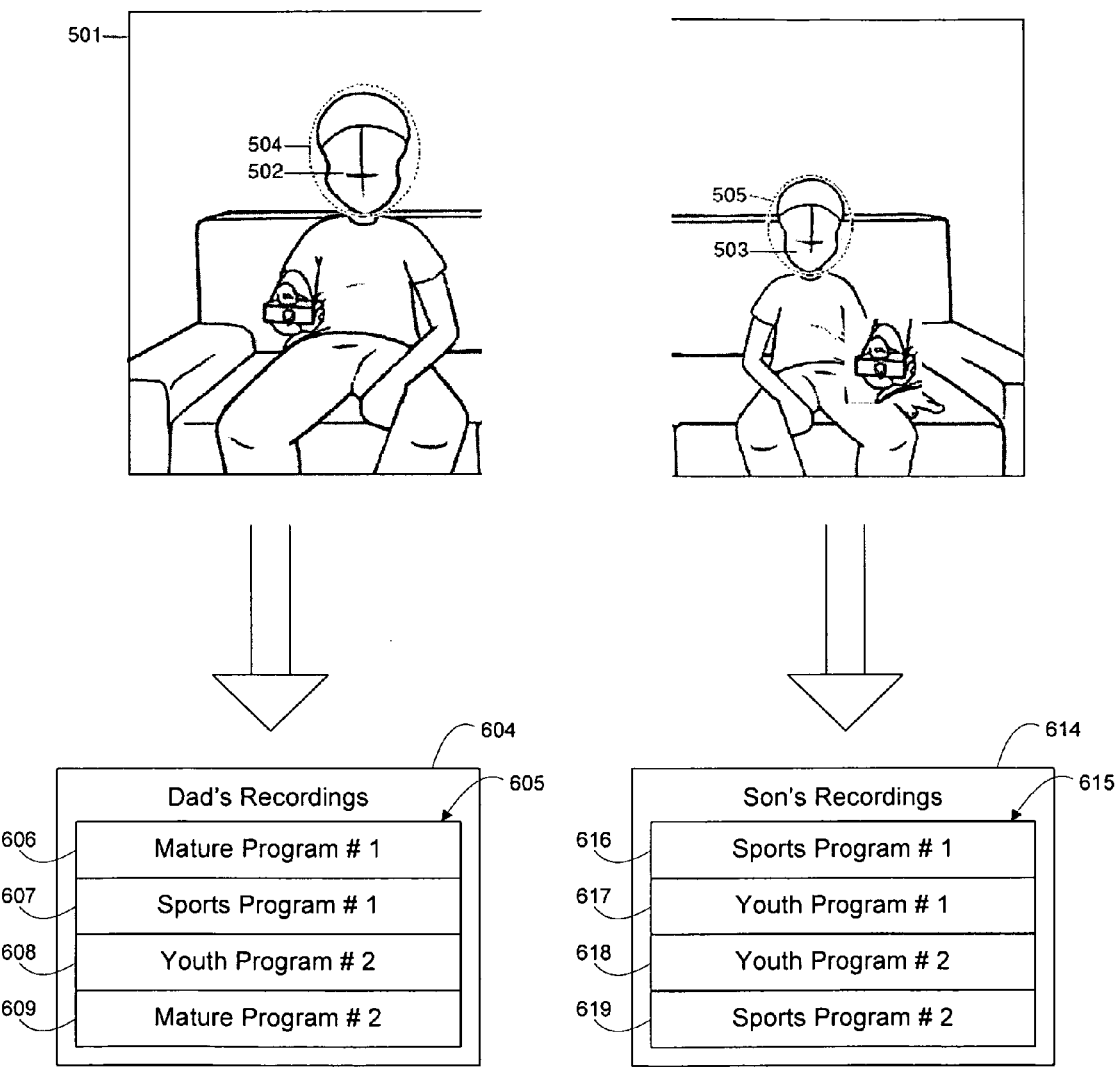
FIGS. 6, 12, 14, 15, and 17 illustrate examples of controlling electronic devices based on media preferences and user interactions.

FIG. 6 illustrates an example in which the personalized media settings include personalized recordings. Briefly, in a first example, personalized recordings are shown for a dad user operating an electronic device and, in a second example, personalized recordings are shown for a son user operating the electronic device. As shown, the personalized recordings for the dad user and the son user may be different, and the personalized recordings for the dad user may be inaccessible by the son user and vice versa.

The camera images 601 and 611 depict an example of camera images where users' faces are detected. In this example, the users' faces may automatically be detected within a camera image, and compared with stored data of registered users to determine the identity of the detected users. Any users who are not identified may be added to the stored data of registered users, thereby registering those users.

Referring to the example camera images 601 and 611, the face 602 of the dad user and the face 612 of the son user may be detected. A sampling process may select a part of the camera image corresponding to each face. For example, part 603 may be selected as corresponding to the face 602 of the dad user and part 613 may be selected as corresponding to the face 612 of the son user. Selecting a part of the camera image may include isolating a face by cropping the camera image, or applying a mask of an oval shape to the camera image. A sampling process may generate a model of a user in accordance with a user identification process. For example, in an implementation in which a user is identified based on facial appearance, a sampling process may store a sample of a user's facial appearance. In another implementation in which a user is identified based on body measurements, a sampling process may store a sample of a three dimensional human body model configuration.

In response to detecting the part 603 of the image as corresponding to the face 602 of the dad user, a personalized recordings list 605 for the dad user may be displayed on an interface 604 of the electronic media device. The personalized recordings list 605 for the dad user includes four recordings, 606-609. Although four recordings are shown for illustrative purposes, the personalized recordings list 605 for the dad user may include more, and perhaps many more, or fewer recordings.

Alternatively, in response to detecting the part 613 of the image as corresponding to the face 612 of the son user, a personalized recordings list 615 for the son user may be displayed on an interface 614 of the electronic media device. The personalized recordings list 615 for the son user includes four recordings, 616-619.

As shown, the personalized recordings list 605 for the dad user is different than the personalized recordings list 615 for the son user. Specifically, although the personalized recording 607 (i.e., Sports Program #1) and the personalized recording 608 (i.e., Youth Program #2) in the personalized recordings list 605 for the dad user correspond to the personalized recording 616 (i.e., Sports Program #1) and the personalized recording 618 (i.e., Youth Program #2) in the personalized recordings list 615 for the son user, the personalized recordings list 605 for the dad user includes the personalized recording 606 (i.e., Mature Program #1) and the personalized recording 609 (i.e., Mature Program #2) that are not included in the personalized recordings list 615 for the son user. Also, the personalized recordings list 615 for the son user includes the personalized recording 617 (i.e., Youth Program #1) and the personalized recording 619 (i.e., Sports Program #2) that are not included in the personalized recordings list 605 for the dad user.

For the recordings that are included on both the personalized recordings list 605 for the dad user and the personalized recordings list 615 for the son user, the electronic media device may store a single instance of the recording such that the same stored recording is accessed regardless of which user (i.e., the dad user or the son user) is watching the recording. In this case, the single instance of the recording would not be deleted from electronic storage until both the dad user and the son user have deleted the recording or the settings for both the dad user and the son user control the electronic media device to delete the recording. In the event that the settings for one of the users would suggest that the recording should be deleted (e.g., based on storage space remaining for recordings or the time/date of the recording), but the other user's settings would not delete the recording, the recording may be maintained in electronic storage and maintained on each of the lists of personalized recordings. Alternatively, to ensure users' privacy, in the event that the settings for the son user would suggest that the recording should be deleted, but the dad user's settings would not delete the recording, the recording may be maintained in electronic storage and maintained only on the dad user's list of personalized recordings, thereby preventing the son user from deducing that the recording is on another registered user's list.

In addition, the personalized recordings for the dad user may not be accessible by the son user, and the personalized recordings for the son user may not be accessible by the dad user. This allows both the dad user and the son user to maintain privacy in the programming they record. For instance, the dad user may record programs that are mature or otherwise inappropriate for the son user without the fear of the son user being able to access the recorded programs.

Figure 7:
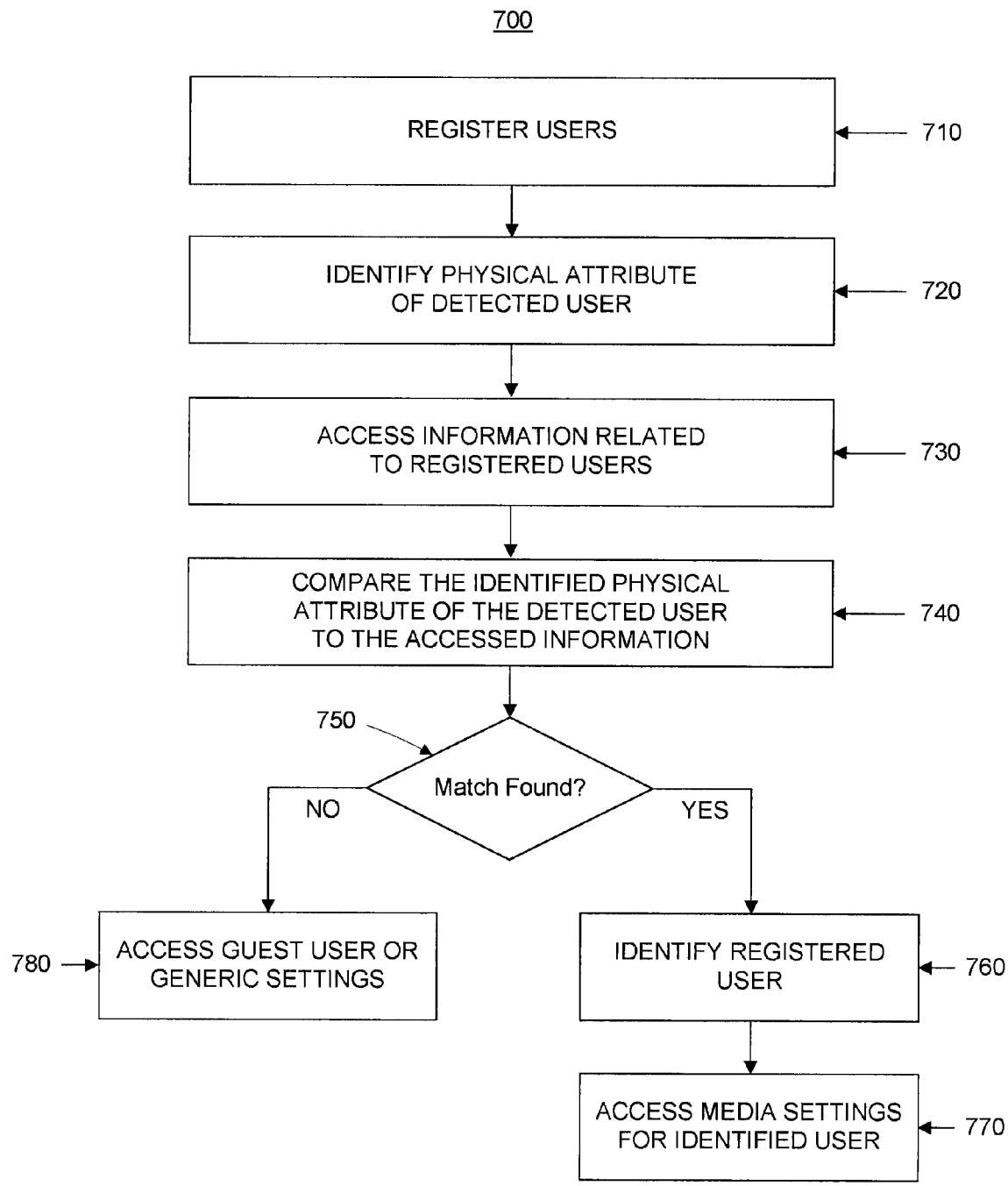

FIG. 7 illustrates a process 700 for accessing personalized media settings for users of an electronic media device. For convenience, particular components described with respect to FIG. 2 are referenced as performing the process 700. However, similar methodologies may be applied in other implementations where different components are used to define the structure of the system (e.g., components described with respect to FIG. 3), or where the functionality is distributed differently among the components.

The processor 205 registers one or more users of the electronic media device 200 (710). Registering users may involve capturing images of a known user and storing the captured images for use in automatically identifying the known user in later processes, such as storing personalized media preferences for the known user and automatically applying personalized media preferences for the known user. The captured images may be stored directly or may be used as a basis for generating a template or other physical attribute data used in later identifying the known user.

For instance, the processor 205 may perform a configuration process to register users. In some examples, the device 200 provides a parent with the ability to register the faces of all members of a household including children, and set media preferences for each family member, or specific combinations of family members. The registered faces may be used to later identify the registered users using a facial recognition process.

A user may control the device 200 to begin the configuration/registration process. In some implementations, to ensure that unauthorized users do not change configuration settings, a user identification process may be performed on the user that began the configuration process. In these implementations, one or more images of the user that began the configuration process may be analyzed to determine whether the user that began the configuration process is authorized to change configuration settings.

Initially (e.g., prior to registration of any users), an unrecognized user may be allowed to start a configuration process. When users are registered, some users may be tagged with administrator rights, such that a user with administrator rights may be permitted to perform the configuration process. After at least one user is given administrator rights, only recognized users with administrator rights may be allowed to perform the configuration process. Administrator rights may correspond to a designation of parent.

Upon entering a configuration process, a face detection process may automatically detect faces within a camera image. A user identification process compares detected faces (e.g., all detected faces) with data stored in the system (e.g., in non-volatile memory). Any users who are not identified are added to the system, thereby registering those users. In some examples, users may be identified, but the user's current appearance may be different than the stored representation of the user's appearance. In these examples, when the degree of similarity of the user's current appearance to the stored representation of the user's appearance is less than a threshold value, the stored representation of the user's appearance may be updated, so that the system adapts to gradual changes in a registered user's appearance (e.g., as a child grows).

During the configuration process, the processor may generate and store a model of a detected user in accordance to a user identification process. For example, in an implementation in which a user identification process identifies a user based on facial appearance, a sampling process may store a sample of a user's facial appearance. In an implementation in which a user identification process identifies a user based on body measurements, a sampling process may store a sample of a three dimensional human body model configuration. A sample may be stored in the storage medium 202 and later accessed by the processor 205 to identify registered users.

Users may establish personalized media settings during the configuration process. Alternatively, users may establish personalized media settings while operating the device 200 after they have been registered. The configuration process also may provide a mechanism to define media settings when an unrecognized user is detected. For instance, an administrator user may define default settings that are applied to any unrecognized user or may define media settings that differ based on physical attributes or inferred demographic information for unrecognized users (e.g., define first default settings for detected users that are determined to be children and define second default settings for detected users that are determined to be adults).

The processor 205 identifies a physical attribute of a user detected in one or more images of users proximate to the electronic media device 200 (720). The physical attribute may be a facial template of the detected user (e.g., a representation of the detected user's face) or a body template of the detected user (e.g., a representation of the detected user's body). The physical attribute also may include a facial feature ratio for the detected user, a size of the detected user, a skin color attribute for the detected user, other measurements of the detected user's body, or a predicted age attribute of the detected user. The processor 205 may identify multiple physical attributes for the detected user and use the multiple physical attributes as a basis for identifying the detected user.

The processor 205 accesses information related to registered users (730). The processor 205 may access the information related to registered users from the storage medium 202. The processor 205 also may receive the information related to registered users in electronic communications over a network or from another device. The information related to registered users may be information obtained during the configuration/registration process described above with respect to numeral 710.

FIG. 8 depicts an example of data 800 stored for registered users. The data 800 includes an identification field 801 and fields 802-805 that store a variety of data that may be used to identify users based on physical attributes. The identification field 801 stores data that identifies (e.g., uniquely) a user by, for example, a user name. The identification field 801 also may store information such as an ID number, or an actual name.

The size field 802 stores information related to a size of the user identified in the identification field 801. The size may be a size ratio of features of the user or may be a relative size of the user as compared to one or more background objects. In implementations in which captured images include depth measurements (e.g., time-of-flight cameras), the size may be an absolute size of the user at a particular depth, or multiple absolute sizes of the user at a variety of corresponding depths. The size information may be expressed as a number pixels, a size of a portion of an image covered by a user, real world measurements, or an estimated height, weight, or volume.

The facial template field 803 stores a facial template for the user identified in the identification field 801. The facial template may be used as part of a facial recognition process to identify users. The facial template may include an actual image of the user's face or may be a computational representation of the user's face that is based on an image of the user's face.

The body model field 804 stores a body model for the user identified in the identification field 801. The body model may be used as part of a body recognition process to identify users. The body model may include an actual image of the user's body or may be a computational representation of the user's body that is based on an image of the user's body.

The age field 805 stores an age attribute for the user identified in the identification field 801. The age attribute may be inputted by the user or may be an age attribute determined based on analysis of an image of the user. The processor 205 may be configured to perform an age classification process to estimate an age of a user in an image and the estimated age may be compared to the age attribute to assist in identification of detected users. The age of a user may be determined based on information stored on or input to the device, or based on performing a query of an external device, such as over a network.

The data 800 includes multiple example records 806-810, each being associated with a different member of a family. For instance, the record 806 is associated with a dad user, the record 807 is associated with a mom user, the record 808 is associated with a son user, the record 809 is associated with a daughter user, and the record 810 is associated with a dog user. As shown, each of the records 806-809 associated with human users has a different facial template attribute, a different body model attribute, and a different age attribute. Any of these attributes, thus, may be used as a basis to uniquely identify which human user in the family is in an image of an area proximate to an electronic media device.

The size attributes of the records 806-809 associated with human users, on the other hand, overlap. For example, the mom user and the son user have the same size attribute (i.e., Size #2). Accordingly, detecting a user with a size attribute of Size #2 in an image of an area proximate to an electronic media device is not sufficient to uniquely identify the user and apply the proper personalized media settings. In this case, further analysis (e.g., comparison of a facial template or a body model) is needed to differentiate between the mom user and the son user. Alternatively, if a user with a size attribute of Size #1 is detected in an image of an area proximate to an electronic media device, the detection is sufficient to identify the user as the dad user because the dad user is the only registered user with the size attribute of Size #1.

The information for the dog user stored in the record 810 may be used as an elimination reference to eliminate consideration of images of the dog detected in an area proximate to the electronic media device. When an object in an image is detected as being the dog based on the record 810, the object is ignored and not used as a basis for controlling the electronic media device. The information for the dog user stored in the record 810 may not include a facial template or an age attribute because either this information is inappropriate for identifying the dog or difficult to obtain for the dog.

Personalized media settings may be associated with a dog user, such that when a dog user is detected, the dog user's personalized media settings may be applied or combined with human users' personalized media settings. For example, a device setting to reduce the bass frequencies of audio, or disable a sub-woofer speaker, may be associated with a dog user, so that the device automatically alters the audio if a dog is detected in order to avoid upsetting or spooking the dog. Personalized media settings may be associated with individually recognized non-human users, group or species classifications of non-human users (for example, a set of personalized media settings for dogs, and another set of personalized media settings for cats), or for pets in general.

Information for a small child or a baby user also may be stored for use as an elimination reference. In some examples, personalized media settings for the small child or the baby user may be applied to create a personalized media experience suitable for the small child or baby user (e.g., lower volume settings may be applied when a small child or baby user is present).

Referring again to FIG. 7, the processor 205 compares the identified physical attribute of the detected user to the accessed information related to registered users (740) and determines whether a match is found (750). For example, the processor 205 may compare the identified physical attribute of the detected user to each of the data records 806-810 included in the data 800 shown in FIG. 8. If the identified physical attribute of the detected user is a facial template that corresponds to facial template #3, the processor 205 determines that the identified physical attribute of the detected user matches the facial template attribute of record 808, which is associated with the son user. In addition, if the identified physical attribute of the detected user is a size that corresponds to Size #3 and a body model that corresponds to body model #4, the processor 205 determines that the identified physical attribute of the detected user matches the record 809, which is associated with the daughter user. Alternatively, if the identified physical attribute of the detected user is a size that corresponds to Size #3 and a body model that corresponds to body model #5, the processor 205 determines that the identified physical attribute of the detected user matches the record 810, which is associated with the dog user and, therefore, ignored.

The processor 205 may determine that a match exists when the identified physical attribute of the detected user exactly or closely matches data included in the data 800. When the identified physical attribute of the detected user does not exactly match data included in the data 800, the processor 205 determines whether the data is close enough to a match to be reasonably certain that the identified attribute corresponds to an attribute of a registered user. Determining whether data is close enough to a match may involve determining a match when a difference between the data and the identified physical attribute is less than a threshold. Multiple attributes may be considered when determining whether a match is close enough and an aggregate of the differences (or other statistical analysis) between identified physical attributes and registered attributes may be used in the determination.

In the event that the processor 205 determines that a match exists, the processor 205 identifies the registered user (760) and accesses personalized media settings for the identified user (765). For instance, the processor 205 may determine the matching data record (e.g., one of data records 806-810) and access user identification information (e.g., user identification information included in the identification field 801) associated with the matching data record. The processor 205 then may use the accessed user identification information to access, from electronic storage (e.g., from storage medium 202), personalized media preferences stored for the user.

In the event that the processor 205 determines that a match does not exist, the processor 205 accesses guest user or generic media settings (780). The guest user or generic settings may be default settings for the electronic media device. The processor 205 also may attempt to infer the preferred settings for the unidentified user and apply those settings as the guest user or generic settings. In this regard, in some configurations, the processor 205 may analyze images of the unidentified user and determine demographic information (e.g., age, gender, etc.) for the unidentified user. The processor 205 may use the determined demographic information to select media preferences thought to be appropriate for users having the determined demographic information.

For instance, if the determined demographic information indicates that the user is a male child, the processor 205 may apply media settings appropriate for a male child (e.g., a channel listing formatted with blue colors and including channels that broadcast shows directed to children/male interests). On the other hand, if the determined demographic information indicates that the user is a female adult, the processor 205 may apply media settings appropriate for a female adult (e.g., a channel listing formatted with pink colors and including channels that broadcast shows directed to adult/female interests). The processor 205 also may compare the determined demographic information for the unidentified user to demographic information known for the registered users and apply the settings of the registered user that most closely resembles the unidentified user.

Figure 9:
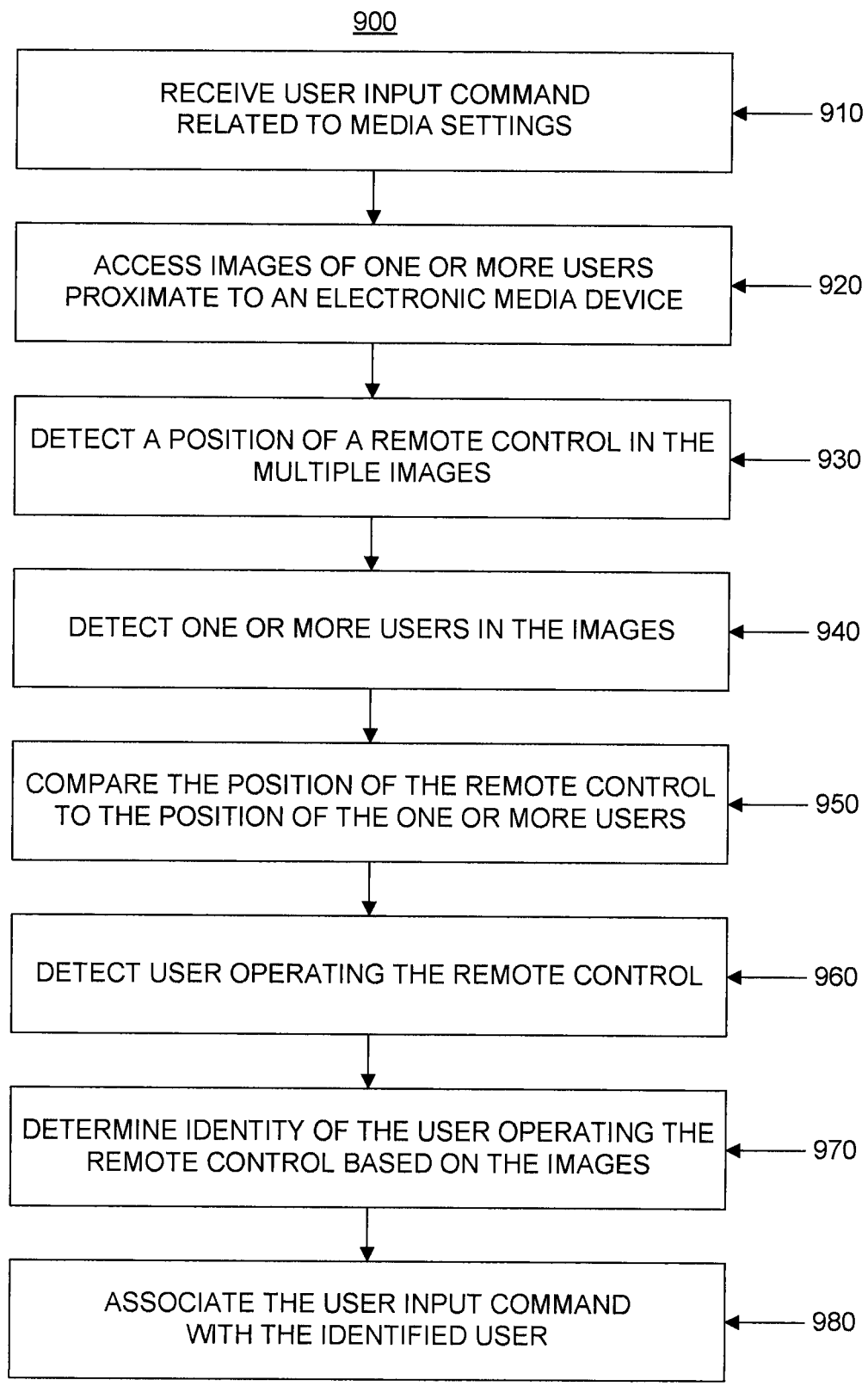

FIG. 9 illustrates a process 900 for associating a user input command with a user operating a remote control. For convenience, particular components described with respect to FIG. 2 are referenced as performing the process 900. However, similar methodologies may be applied in other implementations where different components are used to define the structure of the system (e.g., components described with respect to FIG. 3), or where the functionality is distributed differently among the components.

The processor 205 receives a user input command related to media settings (910). The processor 205 may receive the user input command as control data transmitted from a remote control (e.g., the remote control described above with respect to FIG. 4) using an infrared signal. The device 200 (e.g., television, personal video recorder, DVD player, etc.) may include an infrared receiver configured to receive and decode control data transmitted over a modulated infrared signal and provide the decoded control data to the processor 205.

In response to receiving the user input command, the processor 205 accesses images of one or more users proximate to the electronic media device 200 (920). The processor 205 may access images that are continuously (or regularly/periodically) captured and identify images taken at a time when the user input command was received. The processor 205 also may control a camera to capture images based on receiving the user input command.

The processor 205 detects a position of a remote control in multiple images included in the accessed images (930). Detecting a position of a remote control may involve detecting, in the multiple images, successive images having first presence and then absence of infrared light generated by the remote control in transmitting the user input command. Detection of infrared light enables detection of the remote control because the remote control is the source of the infrared light.

In some examples, a remote control may transmit control data using an infrared signal, and the processor 205 may identify the position of the remote control based upon the light generated from the remote control's infrared emitter. In these examples, a camera may be configured to be sensitive to infrared wavelengths of light. Typical consumer electronic remote controls transmit control data at a wavelength between 850 nm and 950 nm, which may be detected by CCD and CMOS image sensors included in cameras. The camera need not be configured to demodulate the infrared signal to decode the control data because the purpose is to identify a user operating the remote control, rather than determining the command entered by the user.

Figure 10:
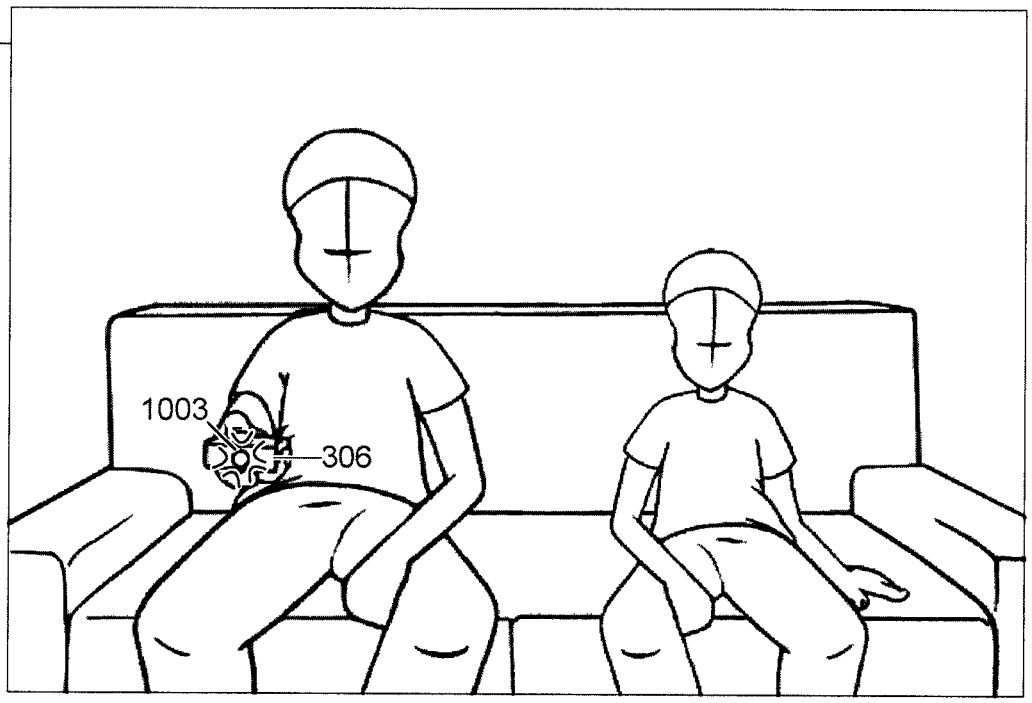
FIG. 10 illustrates examples of camera images including a user operating a remote control.
Figure 10:
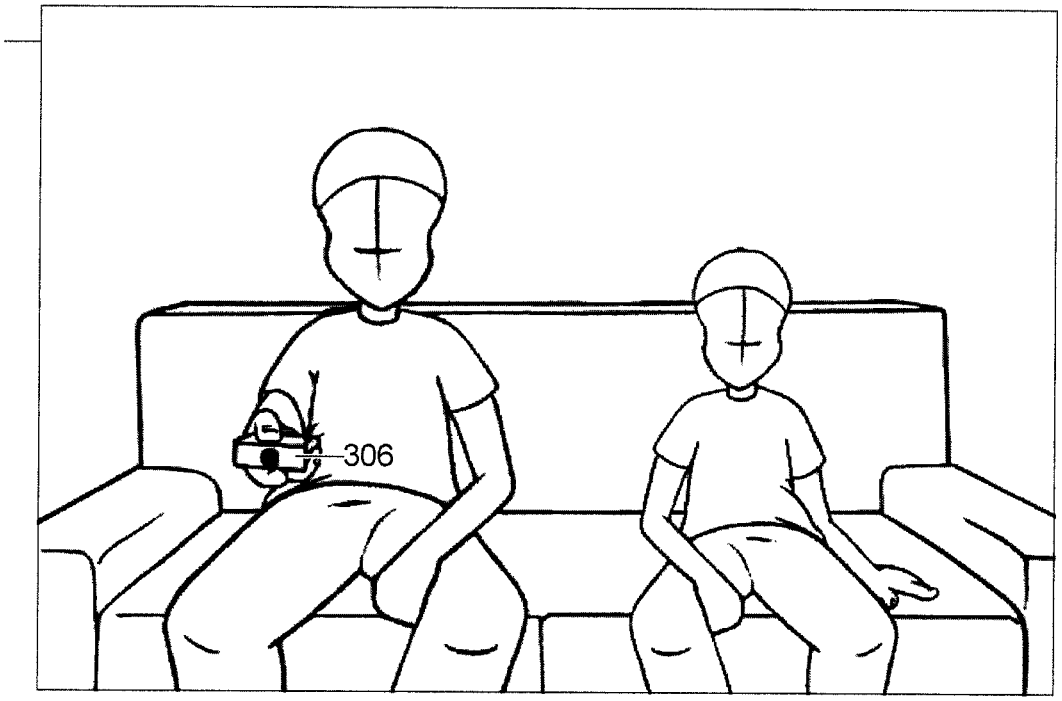

FIG. 10 illustrates examples of camera images including a user operating a remote control. When an infrared receiver of the electronic media device receives control data, the processor 205 may initiate a remote control positioning process (e.g., numeral 930). Referring to the example of FIG. 10, the remote control positioning process scans a first camera image 1001 acquired while the remote 306 is emitting a signal, and scans a second camera image 1002 acquired while the remote 306 is not emitting a signal. The first camera image 1001 may be a current camera image, and the second camera image 1002 may be a recent camera image that is stored in a memory buffer. The process scans the images to detect a point of high luminance 1003 in the first image 1001 that is not found in the second image 1002. The point of high luminance 1003 may be detected as the position of the remote control 306.

Referring again to FIG. 9, the processor 205 detects one or more users in the images (940). For example, the processor 205 detects one or more users in the images using techniques similar to those described above with respect to numeral 520 shown in FIG. 5.

The processor 205 compares the position of the remote control to the position of the one or more detected users (950) and detects a user operating the remote control (960). When multiple users are detected in the accessed images, the processor 205 may analyze the accessed images to determine a position (e.g., a position of a face, a position of a center of mass of the user, a position of the user's hand, etc.) of each of the multiple users. The processor 205 then may compare the position of each of the multiple users to the position of the remote control and identify the user whose position is closest to the remote control. The processor 205 may select the user whose position is closest to the remote control as the user operating the remote control and determine that the other users in the accessed images are not operating the remote control.

Figure 11:
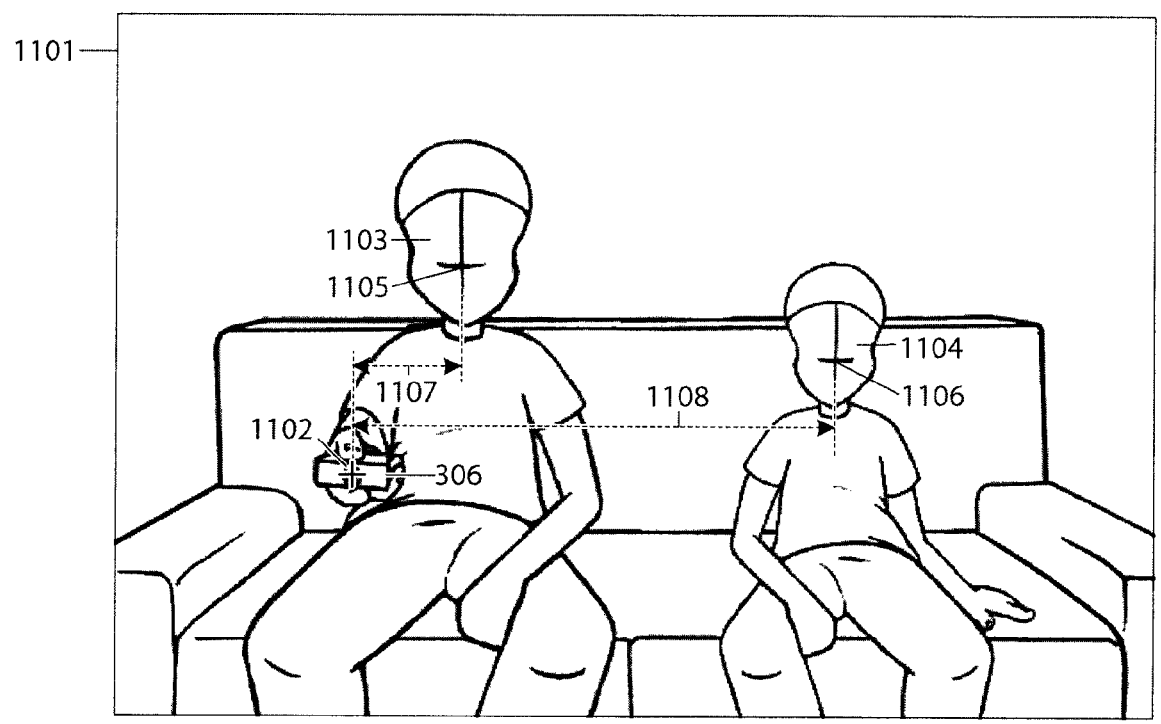
FIG. 11 shows an example of comparing a position of a remote control to a position of a user.

FIG. 11 illustrates an example of comparing a position of a remote control to a position of a user. The processor 205 may associate a detected user in a camera image 1101 with a command transmitted by a remote control 306 based on the position of the remote control relative to detected users within a camera image 1101. As shown in FIG. 11, the processor 205 identifies a position 1102 of a remote control 306 in the camera image 1101 and also detects faces 1103 and 1104 within the camera image 1101. A distance 1107 may be measured between a remote control position 1102 and the position 1105 of a first user in the camera image 1101. A distance 1108 also may be measured between a remote control position 1102 and the position 1106 of a second user in the camera image 1101. The distances 1107 and 1108 may be compared and a shortest distance (i.e., distance 1107) may be selected. The user 1103 associated with the shortest distance (i.e., distance 1107) may be identified as the user operating the remote control 306.

In implementations in which a face position is used as a user position, distance measurement analysis may give stronger weight to the horizontal component of the distance than to the vertical component of the distance because a remote control is typically held at a height lower than a face. In addition, the processor 205 may ask for user input to confirm that the user operating the remote control has been properly identified. For example, if a first user is operating a remote control in a hand that is placed over a second user's shoulder, the position of the remote control may be closer to the second user's face than the first user's face and, thus, the processor 205 may improperly identify the second user as being the user that is operating the remote control. In this example, the first user may provide input overriding the identification of the second user as being the user operating the remote control and indicate that the first user is actually the user operating the remote control. Other techniques (e.g., comparing the position of the remote control to a position of a user's hand, analyzing the body shape of users detected in the images, etc.) may be used to better identify which user is operating the remote control when users are positioned closely together in a camera image.

Referring again to FIG. 9, the processor 205 determines the identity of the user operating the remote control based on the accessed images (970). When multiple users are present within a camera image, a part of the camera image classified as corresponding to the user operating the remote control may be segmented. The segmented portion of the camera image may be analyzed (e.g., using facial recognition or body shape analysis) to determine the identity of the user operating the remote control. The processor 205 may determine the identity of the user operating the remote control based on the accessed images using techniques similar to those described above with respect to numeral 530 shown in FIG. 5 or using techniques similar to those described above with respect to process 700 shown in FIG. 7.

In response to determining the identity of the user operating the remote control, the processor 205 associates the user input command with the identified user (980). When the user input command is a command to perform an operation using the electronic media device, the processor 205 may associate the user input command with the identified user and perform the operation based on media preferences associated with the identified user. For instance, when the user input command is a command to turn the electronic media device on, the electronic media device may turn on, apply the personalized media settings (e.g., display format, volume, theme, etc.) of the identified user, and tune the electronic media device to a favorite channel of the identified user (or otherwise play favorite content of the identified user). When the user input command is a command to display a channel guide or a list of recordings, the processor 205 may control the electronic media device to display a favorite channels list associated with the identified user or a personalized list of recordings for the identified user. In some implementations, the processor 205 controls the electronic media device based on the media preferences of the identified user operating the remote control and ignores the media preferences of other detected users.

Alternatively, the processor 205 controls the electronic media device based on the combined media preferences of all identified users, where the media preferences of the identified user operating the remote control may take priority over the media preferences of other identified users. In cases of conflicting preferences the preference of the user operating the remote control may be used (e.g., if the users have different volume level preferences, the volume level preferred by the user operating the remote control may be used). In cases where the preferences do not conflict the preferences of all the identified users may be combined (e.g., a list of favorite channels may include the favorite channels of the user operating the remote control, followed by any favorite channels of other identified users that are not already in the list).

When the user input command is a command to adjust a media preference, the processor 205 may associate the user input command with the identified user and adjust the personalized media preferences associated with the identified user. For example, when the user input command is a command to adjust a theme setting for the electronic media device, the personalized theme setting for the identified user may be adjusted without adjusting the personalized theme settings for other detected users. In addition, when the user input command is a command to add a channel to a list of favorite channels, the channel is added to the favorite channels list of the identified user without being added to the favorite channels list of other detected users.

Figure 12:
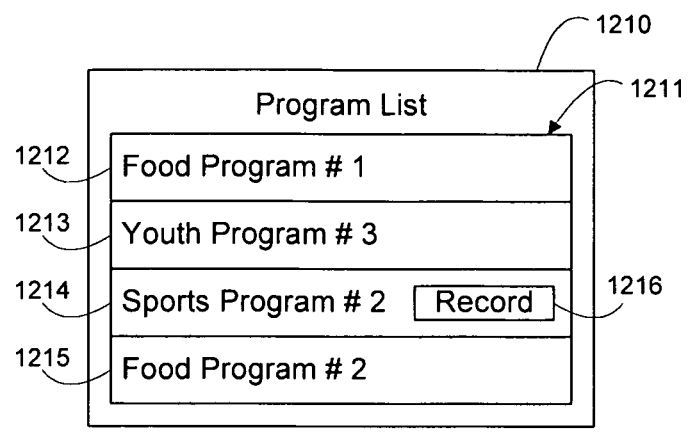
Figure 12:
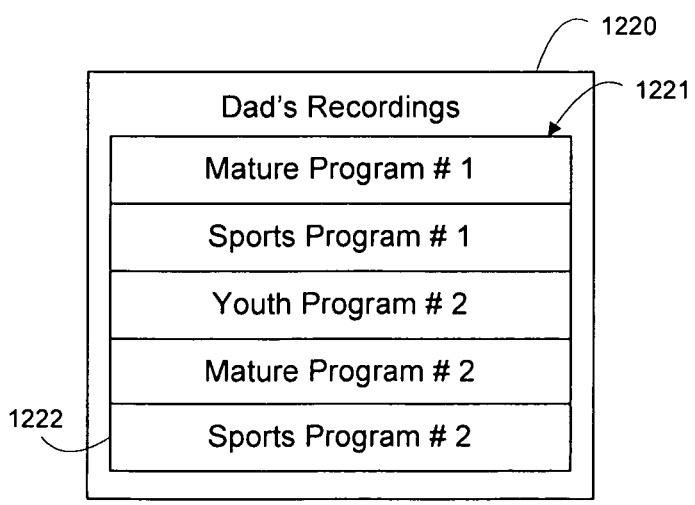

FIG. 12 illustrates an example of associating a user input command to record a program with a user identified as operating the remote control at the time of receipt of the user input command. In this example, a dad user and a son user may be watching television together (e.g., as shown in FIG. 11) and a command may be received to record a television program. For instance, as shown in FIG. 12, a display interface 1210 includes a program list 1211 that includes four programs 1212-1215. A command may be received to activate a user interface control element 1216 to record the program 1214 (i.e., Sports Program #2).

In response to receiving the command, the electronic media device may determine that the dad user is the user operating the remote control (e.g., as shown in FIG. 11) when the command to record the program 1214 (i.e., Sports Program #2) was received. Based on identifying the dad user as the user operating the remote control, the program 1214 (i.e., Sports Program #2) is recorded and associated with the personalized recordings for the dad user. The display interface 1220 shows a list of the dad user's personalized recordings 1221 after associating the record command with the dad user. As shown, when compared to the personalized list of recordings for the dad user shown in FIG. 6, the recording 1222 (i.e., Sports Program #2) has been added to the dad user's personalized list of recordings.

To summarize, FIG. 9 illustrates a process to identify a particular user who is operating a remote control. When multiple users are present in one or more camera images, the processor 205 may determine which user is operating the remote control and, therefore, control the television or other electronic device based on media preferences of the user operating the remote control. The processor 205 may identify a user who is operating a remote control by identifying the position of the remote control in a camera image and correlating that position to a position of a user within the camera image.

For example, the processor 205 may analyze images captured by a camera to detect one or more faces of one or more users located in front of the camera. The processor 205 also may analyze images captured by the camera to detect a remote control. After detecting multiple faces and a remote control, the processor 205 may determine which user is operating the remote control. The processor 205 further may analyze the detected face corresponding to the user who is operating the remote control and determine the identity of the user who is operating the remote control.

In some implementations, the electronic media device may implement a process to track and interpret hand gestures as commands, so that a user may control the electronic media device using hand gestures (e.g., as an alternative interface to using a remote control). Similar to a process to identify a particular user who is operating a remote control, a process to track and interpret hand gestures may associate a hand gesture to a particular user. For example, a process to track and interpret hand gestures may generate a position corresponding to the hand gesture, and compare the position of the hand gesture to positions of detected faces within a camera image to determine the particular user that is performing the hand gesture. The identity of the user performing the hand gesture may be determined and the command represented by the hand gesture may be associated with the identified user.

In other implementations, the electronic media device may implement a process to track and interpret spoken words as commands such that a user may control the electronic media device using voice (e.g., as an alternative interface to using a remote control or a hand gesture). Similar to a process to identify a particular user who is operating a remote control, a process to track and interpret spoken words may associate a voice command to a particular user. In some examples, a process to track and interpret spoken words may determine the identity of the speaker based on the sound of the voice. In these examples, a user identification process may determine if a user associated with the identity of the voice is present.

In some arrangements, the electronic media device may implement a process to detect mouth movements. Faces (e.g., detected by a user detection process) may be analyzed to find a mouth position and mouth pose. A user identification process may be performed for the user detected as moving their mouth and the command represented by the voice command may be associated with the identified user.

Figure 13:
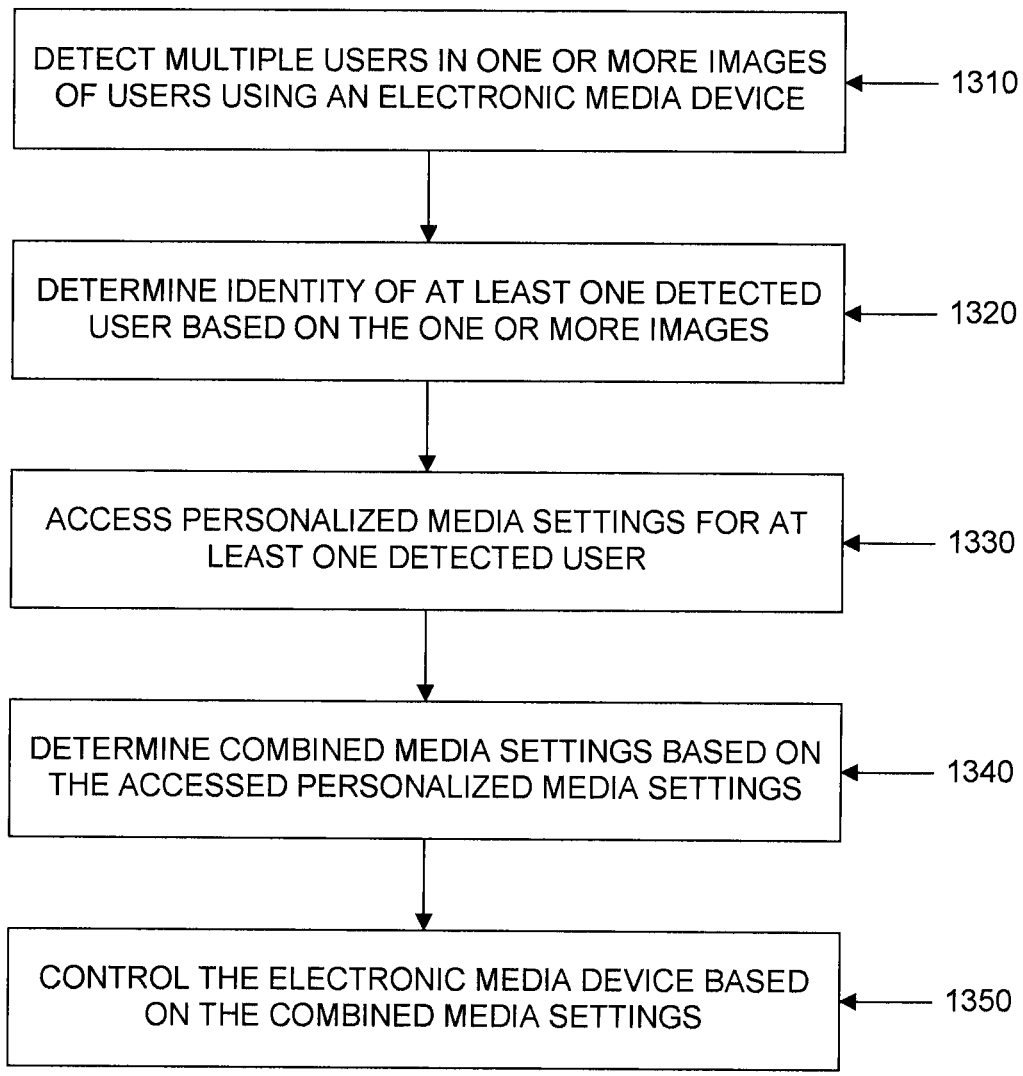

FIG. 13 illustrates a process 1300 for controlling an electronic media device based on combined media settings. For convenience, particular components described with respect to FIG. 2 are referenced as performing the process 1300. However, similar methodologies may be applied in other implementations where different components are used to define the structure of the system (e.g., components described with respect to FIG. 3), or where the functionality is distributed differently among the components.

The processor 205 detects multiple users in one or more images of users using an electronic media device (1310). For example, the processor 205 detects multiple users in one or more images of users using an electronic media device using techniques similar to those described above with respect to numeral 520 shown in FIG. 5.

The processor 205 determines an identity of at least one detected user based on the one or more images (1320) and accesses personalized media settings for the at least one detected user (1330). For example, the processor 205 determines an identity of at least one detected user based on the one or more images and accesses personalized media settings for the at least one detected user using techniques similar to those described above with respect to numerals 530 and 540 shown in FIG. 5 or using techniques similar to those described above with respect to process 700 shown in FIG. 7.

The processor 205 determines combined media settings based on the accessed personalized media settings (1340) and controls the electronic media device based on the combined media settings (1350). For instance, when the accessed media settings include personalized media settings from multiple, different users, the processor 205 determines combined media settings based on the personalized media settings associated with each of the multiple, different users. As one example, the processor 205 may control the electronic media device to have a display format based on a first user's media settings and have a volume based on a second user's media settings.

The processor 205 may combine media settings based on a set rules. The set of rules may indicate which user's media settings to apply when multiple users are present. For instance, the set of rules may indicate that, when a dad user and a son user are watching television together, the personalized media settings for the dad user override the personalized media settings for the son user and are applied. Alternatively, the set of rules may further indicate that, when the son user and a daughter user are watching television together, the personalized media settings for the son user override the personalized media settings for the daughter user and are applied. The set of rules also may indicate that the personalized media settings for the user operating the remote control are applied.

The set of rules may operate on a setting-by-setting basis such that some settings for a first user may be applied and some settings for a second user may be applied. For example, the set of rules may indicate that, when a dad user and a son user are watching television together, the personalized volume setting for the dad user is applied, and that the personalized theme setting for the son user is applied.

The set of rules also may include rules that combine personalized media settings based on the specific settings without regard for the user associated with the settings. For instance, a rule may indicate that the lowest volume setting included in the personalized media settings is applied when combining media settings. Alternatively, a rule may indicate that, when combining media settings, personalized volume settings may be combined to use an average or median volume setting from among the personalized volume settings for each of the users.

When the accessed personalized media settings include lists of content items (e.g., lists of channels, lists of songs, lists of recordings, etc.) the lists of content items may be combined to generate a combined list of content items. In combining lists of content items, the processor 205 may identify content items that are common to all of the lists of content items and generate the combined list based on the content items that are common to all of the lists of content items. Alternatively, the processor 205 may generate a combined list that includes all of the content items that are included on any of the lists of content items. The processor 205 may ignore content items marked by a user as private and ensure that all of the content items included on the combined list are appropriate for all of the detected users (e.g., mature programs that otherwise would be included in the combined list may not be included in the combined list when children are present). The processor 205 also may employ a more sophisticated set of rules in combining content items.

Figure 14:
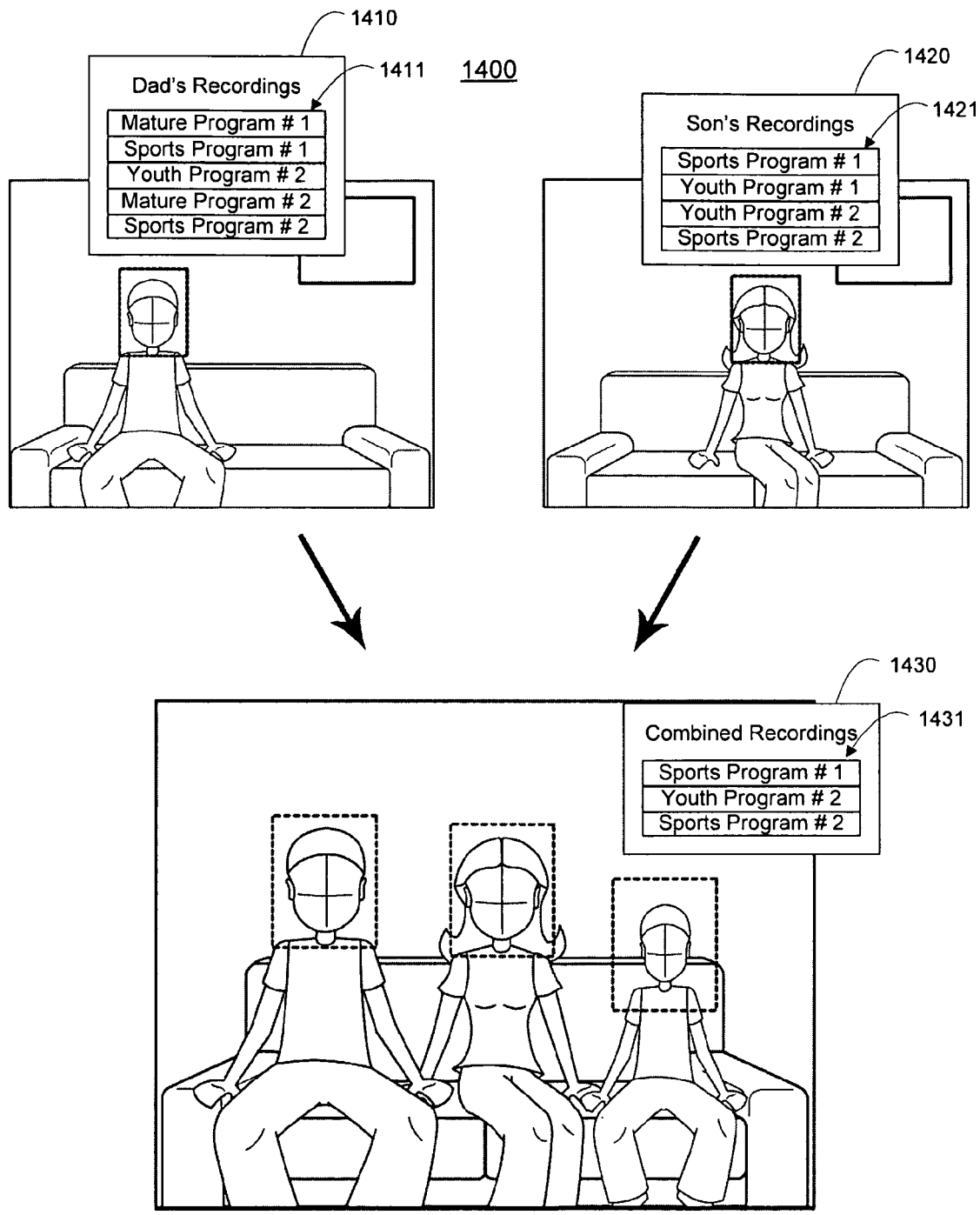

FIG. 14 is a contextual diagram 1400 illustrating an example of combining personalized media settings. As shown, a display interface 1410 includes a personalized list of recordings 1411 for a dad user and a display interface 1420 includes a personalized list of recordings 1421 for a son user. When the dad user is accessing a list of recordings alone, the entire personalized list of recordings 1411 for the dad user is displayed. When the son user is accessing a list of recordings alone, the entire personalized list of recordings 1421 for the son user is displayed.

However, when the dad user and the son user are accessing a list of recordings together, a combined list of recordings is generated based on the personalized list of recordings 1411 for the dad user and the personalized list of recordings 1421 for the son user. As shown, a display interface 1430 includes a combined list of recordings 1431. In this example, the combined list of recordings 1431 includes those recordings that are included on both the personalized list of recordings 1411 for the dad user and the personalized list of recordings 1421 for the son user (i.e., Sports Program #1, Youth Program #2, and Sports Program #2).

Figure 15:
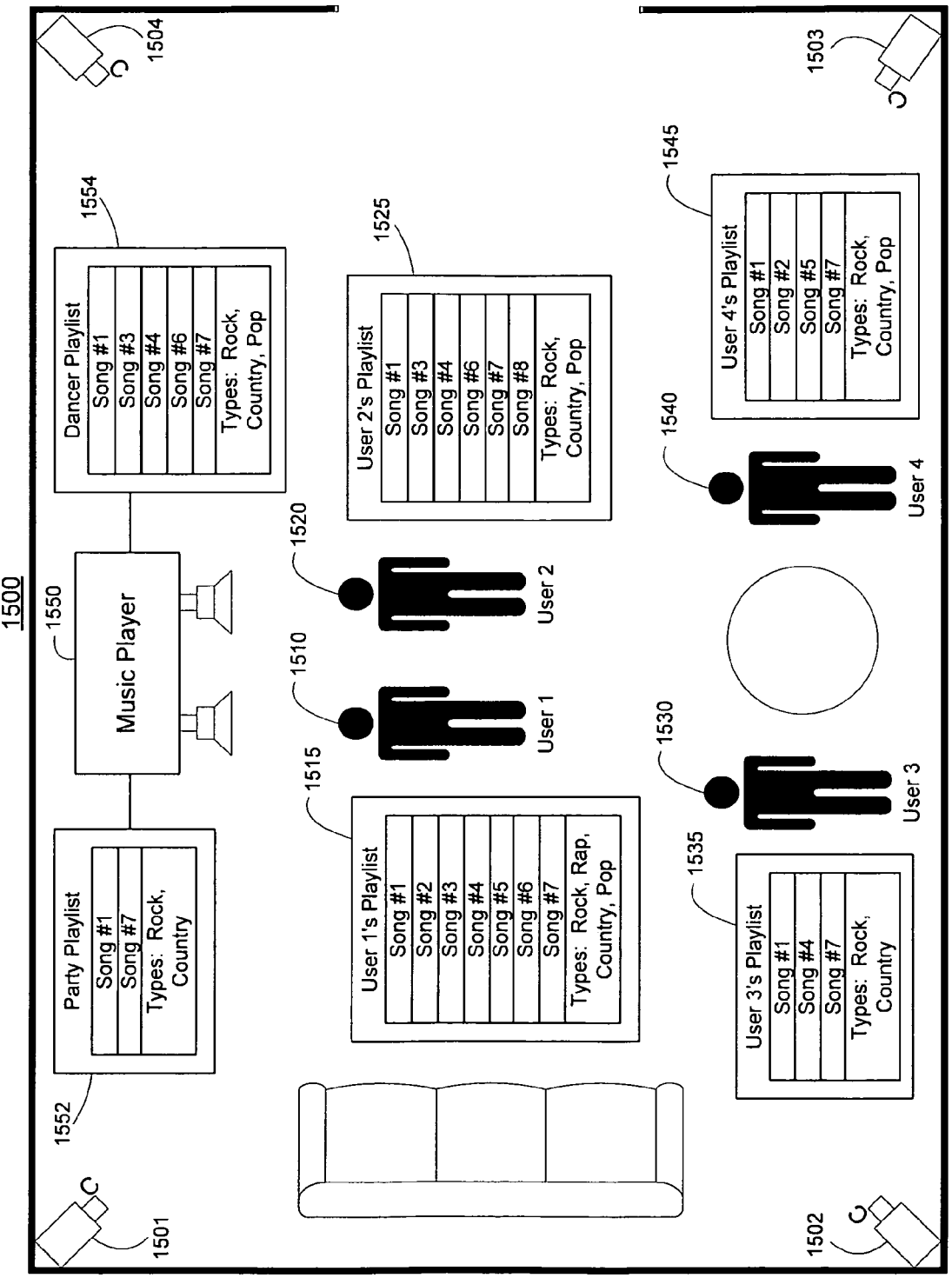

FIG. 15 illustrates a system 1500 that combines personalized song play lists. The system 1500 includes four cameras 1501-1504. As shown, the four cameras 1501-1504 are positioned in the four corners of a room to provide imaging coverage for the room from a variety of angles and perspectives. Including multiple cameras may enable better detection and identification of users that are present in the room and participating in a party or gathering. Although four cameras 1501-1504 are shown, the system 1500 may include more, and perhaps many more, or fewer cameras.

The system 1500 further includes a music player 1550 that is configured to play music for the users present in the room. The music player 1550 may be configured to play music based on media preferences (e.g., personalized song play lists) and also may be configured to combine personalized media settings for users present in a room with the music player 1550. The music player 1550 may store personalized media settings or may receive, over a network or directly from another electronic device, individual or already combined personalized media settings for users present in the room with the music player 1550.

In some implementations, the music player 1550 may receive images directly from the cameras 1501-1504 and analyze those images to determine an identity of users in the room with the music player 1550. In other implementations, the music player 1550 may receive identity information for users in the room with the music player 1550 from another device. The music player 1550 may be a stereo system, a digital music player, a CD player, or any other type of device configured to play music.

As shown, four users 1510, 1520, 1530, and 1540 are present in the room with the music player 1550 (e.g., the four users 1510, 1520, 1530, and 1540 may be attending a party). Each of the users has personalized media preferences 1515, 1525, 1535, and 1545 that include a personalized song play list and a personalized type of music the user enjoys.

To determine combined media preferences used in controlling the music player 1550, the system 1500 determines the identity of each of the four users 1510, 1520, 1530, and 1540 based on images captured by the cameras 1501-1504 and accesses the personalized media preferences 1515, 1525, 1535, and 1545 associated with each of the four users 1510, 1520, 1530, and 1540, respectively. Accessing the personalized media preferences 1515, 1525, 1535, and 1545 may include accessing the personalized media preferences 1515, 1525, 1535, and 1545 from electronic storage associated with the system 1500, or receiving the personalized media preferences 1515, 1525, 1535, and 1545 from a server over a network (e.g., a server configured to store song play lists associated with users).

Accessing the personalized media preferences 1515, 1525, 1535, and 1545 also may include receiving the personalized media preferences 1515, 1525, 1535, and 1545 from portable devices carried by each of the four users 1510, 1520, 1530, and 1540 (e.g., using the Bluetooth protocol). For instance, a user may be carrying a portable digital music player that stores a song play list for the user and the portable digital music player may communicate the song play list for the user to the system 1500 when the user enters the room.

The system 1500 determines combined media preferences based on the personalized media preferences 1515, 1525, 1535, and 1545 associated with each of the four users 1510, 1520, 1530, and 1540 and controls the music player 1550 based on the combined media preferences. For example, the system 1500 may generate a party play list 1552 that reflects the media preferences of all of the four users 1510, 1520, 1530, and 1540 or the most common preferences among the four users. The party play list 1552 includes a combined song play list that includes two songs (i.e., Song #1 and Song #7). The combined song play list includes Song #1 and Song #7 because these are the songs that are included on each of the users' 1510, 1520, 1530, and 1540 personalized song play lists. In addition, the party play list 1552 designates the preferred type of music as Rock and Country because Rock and Country are known to be types of music each of the users enjoys based on the personalized media preferences 1515, 1525, 1535, and 1545.

If the party play list 1552 becomes exhausted (e.g., the music player 1550 has played each song on the party play list 1552 at least once), additional songs may be selected based upon the number of user's play lists that include each song, and added to the party play list 1552. For example, Song #4 may be added to the party play list because it is in three users' play lists. Once the music player 1550 has played Song #4, the party play list is once again exhausted, and additional songs may be added (e.g., Song #2, Song #3, Song #5, and Song #6 which are each in two users' play lists).

Alternatively, the party play list 1552 may include a combined song list that includes all songs from all the user's play lists. The party play list may include a priority for each song, where the priority is calculated based upon the number of users' play lists that include each song. For example, Song #1 and Song #7 may be assigned a priority of four because it is in four users' play lists; Song #3 may be assigned a priority of three because it is in three users' play lists; Song #2, Song #3, Song #5, and Song #6 may be assigned a priority of two because they are each in two users' play lists. The music player 1550 may select a random song based on the priorities of each song in the party play list, where the probability of selecting a song depends on the priority. For example, the probability of selecting Song #1 may be twice the probability of selecting Song #2, because Song #1 occurs in twice as many user play lists as Song #2. Song priorities within the party play list may additionally be based upon rankings within each individual user's play list (for example, the frequency in which a user plays a song or a rating assigned to the song by the user).

In some implementations, the system 1500 may determine the combined media preferences based on position of users within the room. For example, a center of the room may be a dance floor and combined media preferences may be generated based on preferences of those users positioned on the dance floor. In this example, as shown, the system 1500 may analyze the positions of users in the room and determine that the users 1510 and 1520 are on the dance floor. The system 1500 than may generate a dancer play list 1554 to reflect the media preferences of the users 1510 and 1520 detected as being on the dance floor.

The dancer play list 1554 includes a combined song play list that includes five songs (i.e., Song #1, Song #3, Song #4, Song #6, and Song #7). The combined song play list includes Song #1, Song #3, Song #4, Song #6, and Song #7 because these are the songs that are included on each of the personalized song play lists of users 1510 and 1520. The personalized song play lists of users 1530 and 1540 are ignored in generating the dancer play list 1554 because the users 1530 and 1540 are not on the dance floor. In addition, the dancer play list 1554 designates the preferred type of music as Rock, Country, and Pop because Rock, Country, and Pop are known to be types of music enjoyed by users on the dance floor. The dancer play list 1554 may be dynamically updated (e.g., continuously or periodically) as users enter and exit the position of the room corresponding to the dance floor.

Figure 16:
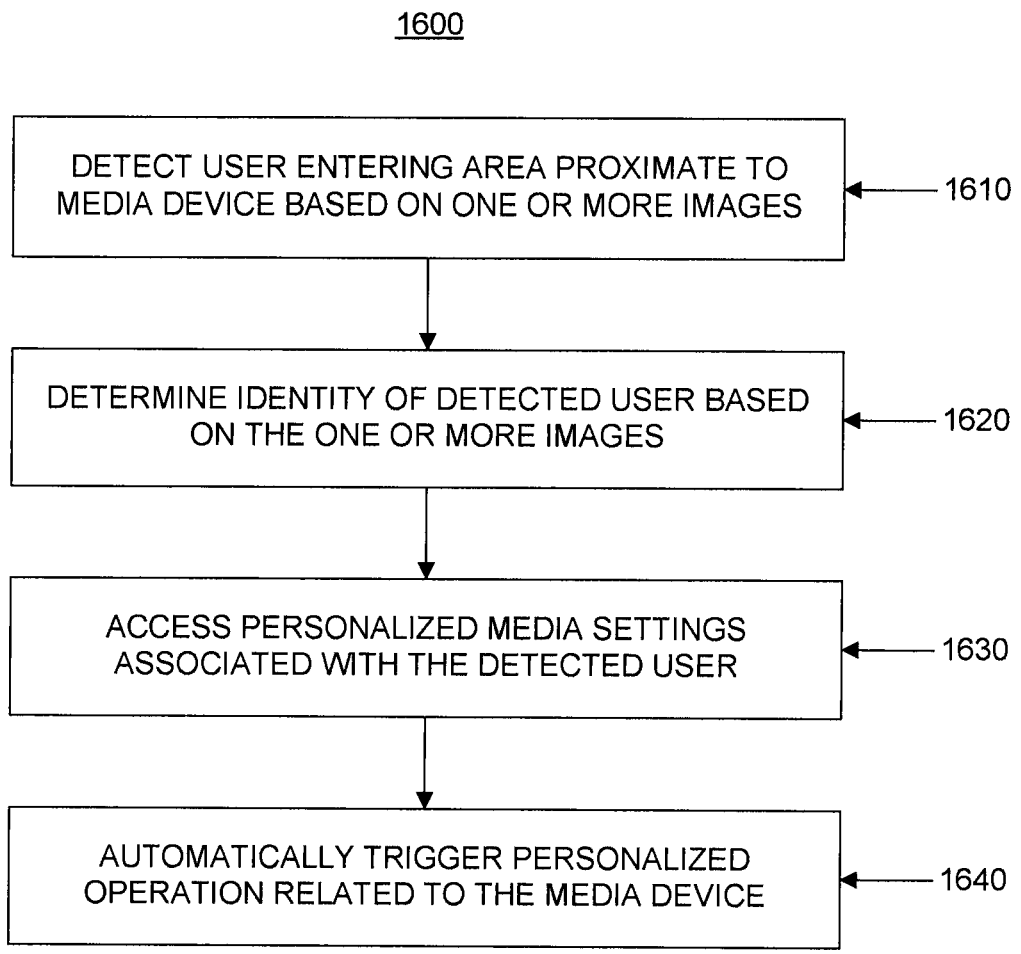

FIG. 16 illustrates a process 1600 for automatically triggering a personalized operation related to an electronic media device. For convenience, particular components described with respect to FIG. 2 are referenced as performing the process 1600. However, similar methodologies may be applied in other implementations where different components are used to define the structure of the system (e.g., components described with respect to FIG. 3), or where the functionality is distributed differently among the components.

The processor 205 detects a user entering an area proximate to an electronic media device based on one or more images (1610). For instance, the processor 205 may continuously or periodically monitor images of an area proximate to the electronic media device to detect motion or changes to a background model. The processor 205 may analyze images of the area proximate to the electronic media device to detect users when the electronic media is operating and also when the electronic media device is in an off state. The processor 205 may detect a user based on one or more images using techniques similar to those described above with respect to numeral 520 shown in FIG. 5.

The processor 205 determines an identity of the detected user based on the one or more images (1620) and accesses personalized media settings associated with the detected user (1630). For example, the processor 205 determines an identity of the detected user based on the one or more images and accesses personalized media settings associated with the detected user using techniques similar to those described above with respect to numerals 530 and 540 shown in FIG. 5 or using techniques similar to those described above with respect to process 700 shown in FIG. 7.

In response to detecting and identifying the user, the processor 205 automatically triggers a personalized operation related to the electronic media device (1640). Automatically triggering a personalized operation may occur without human intervention and may include applying any type of personalized media setting discussed throughout this disclosure. When the processor 205 detects and identifies the user when the electronic media device is in an off state, the personalized operation may be to turn the device to an on state and adjust the media settings for the electronic media device to correspond to the accessed personalized media settings associated with the detected user.

When the processor 205 detects and identifies the user when the electronic media device is in an on state, the processor 205 may dynamically change media settings based on the accessed personalized media settings associated with the detected user. For instance, if a channel guide is being displayed when the user is detected as entering the area proximate to the electronic media device, the processor 205 may dynamically update the channel guide based on a favorite channels list associated with the detected user. When one or more users are already present in the area proximate to the electronic media device when the processor 205 detects and identifies the user, the processor 205 may dynamically generate and apply combined media settings based on the accessed personalized media settings associated with the detected user and personalized media settings associated with the one or more users that are already present in the area proximate to the electronic media device.

Figure 17:
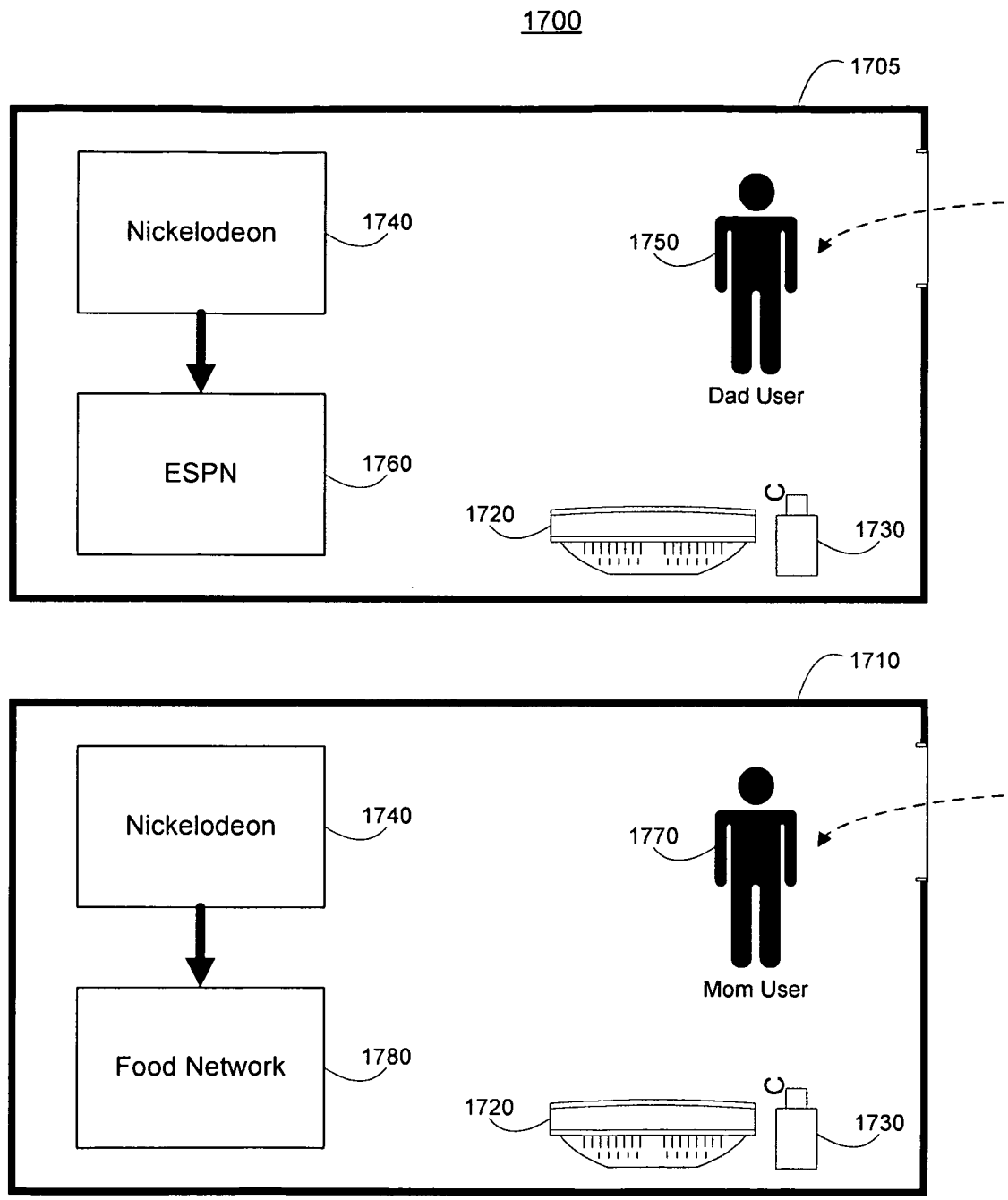

FIG. 17 illustrates a system 1700 that automatically triggers a personalized operation related to an electronic media device. The system 1700 includes a television 1720, a camera 1730, and a processing device (not shown). The television 1720 includes a display 1740 that displays television programming, and the camera 1730 captures images of an area proximate to the television 1720. The processing device processes the images captured by the camera 1730 to detect a user entering the area proximate to the television 1720 and, in response to detecting a user entering the area proximate to the television 1720, controls the television 1720 based on personalized media settings for the detected user. The processing device may be included in the television 1720 or may be a separate device electrically connected to the television 1720 via a wired or wireless connection.

In the example 1705, the processing device detects the dad user 1750 entering the area proximate to the television 1720 based on images captured by the camera 1730. Immediately prior to the dad user 1750 entering the area proximate to the television 1720, the television 1720 is tuned to the channel Nickelodeon as shown on the display 1740. In response to detecting the dad user 1750 entering the area proximate to the television 1720, the processing device controls the television 1720 to change the channel based on personalized media settings associated with the dad user 1750. As shown on the display 1760, the processing device automatically, without human intervention, changes the channel of the television 1720 to the channel ESPN in response to detecting and identifying the dad user 1750 as entering the area proximate to the television 1720.

In the example 1710, the processing device detects the mom user 1770 entering the area proximate to the television 1720 based on images captured by the camera 1730. Immediately prior to the mom user 1770 entering the area proximate to the television 1720, the television 1720 is tuned to the channel Nickelodeon as shown on the display 1740. In response to detecting the mom user 1770 entering the area proximate to the television 1720, the processing device controls the television 1720 to change the channel based on personalized media settings associated with the mom user 1770. As shown on the display 1780, the processing device automatically, without human intervention, changes the channel of the television 1720 to the channel Food Network in response to detecting and identifying the mom user 1770 as entering the area proximate to the television 1720.

Figure 18:
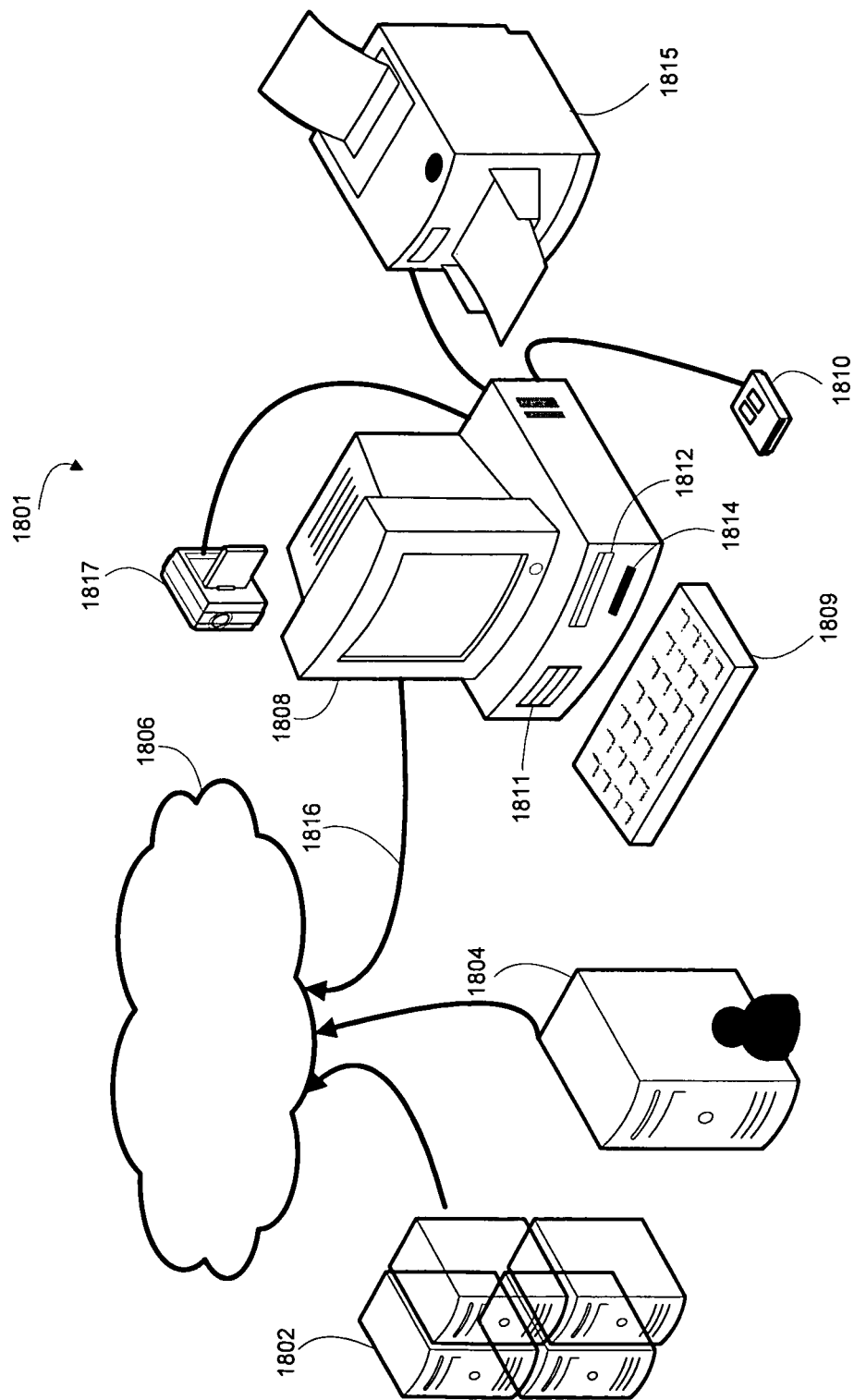
FIG. 18 illustrates components of an exemplary computer processing system.

FIG. 18 illustrates components of an exemplary computer processing system. Briefly, the system 1800 includes a computing device 1801 that includes a processor configured to control an application that is configured to control access and media preferences of content by identifying users. The device 1801 may be configured to exchange electronic communications over a network 1806 with one or more servers including a server 1802 and a server 1804.

In more detail, the hardware environment of the computing device 1801 includes a display monitor 1808 for displaying text and images to a user, a keyboard 1809 for entering text data and user commands into the computing device 1801, a mouse 1810 for pointing, selecting and manipulating objects displayed on the display monitor 1808, a fixed disk drive 1811, a removable disk drive 1812, a tape drive 1814, a hardcopy output device 1815, a computer network connection 1816, and a digital input device 1817.

The display monitor 1808 displays the graphics, images, and text that comprise the user interface for the software applications used by the computing device 1801, as well as the operating system programs necessary to operate the computing device 1801. A user uses the keyboard 1809 to enter commands and data to operate and control the computer operating system programs as well as the application programs. The mouse 1810 may be any type of pointing device, and may be a joystick, a trackball, a touch-pad, or other pointing device. Software used to display a user interface and enable a user to enter text, numbers, or select from a menu of options is stored locally on computer readable memory media, such as the fixed disk drive 1811.

In a further implementation, the fixed disk drive 1811 itself may include a number of physical drive units, such as a redundant array of independent disks ("RAID"), or may be a disk drive farm or a disk array that is physically located in a separate computing unit. Such computer readable memory media allow the computing device 1801 to access computer-executable process steps, application programs and the like, stored on removable and non-removable memory media.

The computer network connection 1816 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1806 may be a LAN network, a corporate or government WAN network, the Internet, or other network.

The computer network connection 1816 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-2894 FIREWIRE® connector, a Universal Serial Bus ("USB") connector, a serial port connector, a parallel port connector, or other wireline connector.

The removable disk drive 1812 is a removable storage device that is used to off-load data from the computing device 1801 or upload data onto the computing device 1801. The removable disk drive 1812 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1811 or on removable media for the removable disk drive 1812.

The tape drive 1814 is a tape storage device that is used to off-load data from the computing device 1801 or to upload data onto the computing device 1801. The tape drive 1814 may be a quarter-inch cartridge ("QIC"), 4 mm digital audio tape ("DAT"), 8 mm digital linear tape ("DLT") drive, or other type of tape.

The hardcopy output device 1815 provides an output function for the operating system programs and applications. The hardcopy output device 1815 may be a printer or any output device that produces tangible output objects, including textual or image data or graphical representations of textual or image data. While the hardcopy output device 1815 is depicted as being directly connected to the computing device 1801, it need not be. For instance, the hardcopy output device may be connected to the computing device 1801 via a network interface, such as a wireline or wireless network.

Furthermore, although the computing device 1801 is described above as a desktop PC, in further implementations the computing device 1801 may be a laptop, a workstation, a midrange computer, a mainframe, an embedded system, telephone, a handheld or tablet computer, a PDA, or other type of computer.

Figure 19:
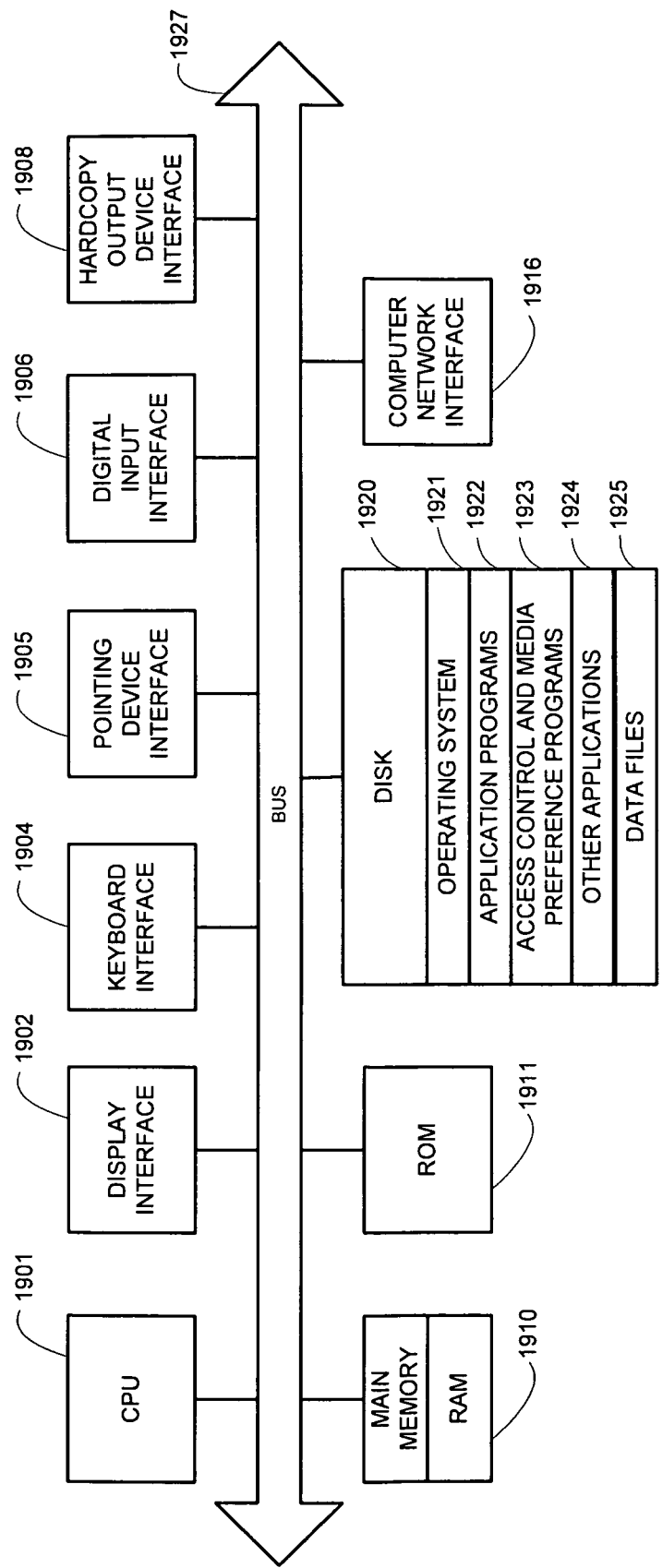
FIG. 19 is a block diagram illustrating the internal architecture of the computer shown in FIG. 18.

FIG. 19 is a block diagram illustrating the internal architecture of a computer shown in FIG. 18. An exemplary internal architecture of the computing device 1801 is now described. The computing environment includes a computer central processing unit ("CPU") 1901, where the computer instructions that comprise an operating system or an application are processed; a display interface 1902 which provides a communication interface and processing functions for rendering graphics, images, and texts on the display monitor 1808; a keyboard interface 1904 which provides a communication interface to the keyboard 1809; a pointing device interface 1905 which provides a communication interface to the mouse 1810 or an equivalent pointing device; a digital input interface 1906 which provides a communication interface to the digital input device 1817; a hardcopy output device interface 1908 which provides a communication interface to the hardcopy output device 1815; a random access memory ("RAM") 1910 where computer instructions and data are stored in a volatile memory device for processing by the computer CPU 1901; a read-only memory ("ROM") 1911 where invariant low-level systems code or data for basic system functions such as basic input and output ("I/O"), startup, or reception of keystrokes from the keyboard 1809 are stored in a non-volatile memory device; and a storage 1920 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1921, application programs 1922 (including the access control and media preference programs 1923, and other applications 1924 as necessary) and data files 1925 are stored; a computer network interface 1916 which provides a communication interface to the network 1806 over the computer network connection 1816. The constituent devices and the computer CPU 1901 communicate with each other over the computer bus 1927.

The RAM 1910 interfaces with the computer bus 1927 so as to provide quick RAM storage to the computer CPU 1901 during the execution of software programs such as the operating system application programs, and device drivers. More specifically, the computer CPU 1901 loads computer-executable process steps from the fixed disk drive 1811 or other memory media into a field of the RAM 1910 in order to execute software programs. Data is stored in the RAM 1910, where the data is accessed by the computer CPU 1901 during execution.

The computing device 1801 stores computer-executable code for an operating system 1921, application programs 1922 such as word processing, spreadsheet, presentation, gaming, or other applications. Although it is possible to display a user interface and enable a user to enter text, numbers, or select from a menu of options using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 1901 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1901 is more than one processing unit, including a multiple CPU configuration found in high-performance workstations and servers, or a multiple scalable processing unit found in mainframes.

The operating system 1921 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1921 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 18 and 19 illustrate one possible implementation of a computing device that executes program code, or program or process steps, configured to effectuate control of an application that is configured to enable a user to enter text, numbers, or select from a menu of options, other types of computers also may be used as well.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    determining an identity of a user detected within an image of an area proximate to an electronic media device based at least in part on a stored representation of an appearance of the user;
    updating the stored representation of the appearance of the user if a degree of similarity of a current appearance of the user to the stored representation is less than a threshold value;
    accessing personalized media settings associated with the user based on the determined identity; and
    controlling the electronic media device based on the accessed personalized media settings, wherein
    a face in the image is ignored based on the face being smaller than a predefined size threshold if the stored representation of the appearance comprises the face.

2. The computer-implemented method of claim 1 further comprising:
    receiving, at the electronic media device, a user input command; and
    accessing one or more images of an area proximate to the electronic media device in response to receiving the user input command,
    wherein determining the identity of the user detected within the image of the area proximate to the electronic media device includes determining the identity of the user based on the one or more accessed images.

3. The computer-implemented method of claim 1 wherein:
    accessing personalized media settings associated with the user based on the determined identity includes at least one of accessing a favorite channel list maintained by the user, accessing a list of recordings maintained by the user, and
    accessing a song play list maintained by the user; and
    controlling the electronic media device based on the accessed personalized media settings includes at least one of controlling the electronic media device to render a display of the favorite channel list maintained by the user on an electronic programming guide generated by the electronic media device, controlling the electronic media device to render a display of the list of recordings maintained by the user, and controlling the electronic media device to play songs based on the song play list maintained by the user.

4. The computer-implemented method of claim 1 wherein: accessing personalized media settings associated with the user based on the determined identity includes accessing at least one of DVR recordings, channels, songs, ratings, shows, themes, display settings, volume settings, and room lighting settings.

5. The computer-implemented method of claim 1 wherein determining the identity of the user detected within the image of the area proximate to the electronic media device includes:
    detecting multiple users in the image; detecting a position of a remote control in the image;
    identifying the user operating the remote control based on the detected multiple users and the detected position of the remote control; and
    determining an identity of the user operating the remote control.

6. The computer-implemented method of claim 1 further comprising:
    registering one or more users, registering the one or more users including: capturing one or more images of each of the one or more users;
    identifying one or more physical attributes of each of the one or more users based on the one or more captured images of each of the one or more users; and
    storing, in electronic storage, the identified one or more physical attributes of the one or more users,
    wherein determining the identity of the user detected within the image of the area proximate to the electronic media device includes:
    identifying one or more physical attributes of the user based on the image;
    accessing, from electronic storage, registration information related to the one or more registered users, the registration information including, for each of the one or more registered users, identification information stored in association with one or more physical attributes;
    comparing the identified one or more physical attributes of the user to the accessed registration information;
    based on the comparison, determining whether the identified one or more physical attributes of the user match one or more physical attributes included in the registration information; and
    in response to determining that the identified one or more physical attributes of the user match one or more physical attributes included in the registration information, accessing, from the registration information, identification information corresponding to the matched one or more physical attributes.

7. The computer-implemented method of claim 6 wherein:
    registering the one or more users further includes receiving identification information associated with each of the one or more users; and
    storing, in electronic storage, the identified one or more physical attributes of the one or more users further includes storing, in electronic storage, the received identification information in association with the identified one or more physical attributes of the one or more users corresponding to the received identification information.

8. The computer-implemented method of claim 6 wherein:
    identifying one or more physical attributes of the user based on the image includes identifying one or more body attributes of the user, and
    the comparing and determining are part of a body recognition process based on the one or more body attributes of the user.

9. The computer-implemented method of claim 6 wherein:
    identifying one or more physical attributes of the user based on the image includes identifying one or more facial attributes of the user, and the comparing and determining are part of a facial recognition process based on the one or more facial attributes of the user.

10. The computer-implemented method of claim 1 further comprising:
   receiving a user input command that is provided by a user using a remote control;
   accessing multiple images of one or more users, including the user using the remote control, proximate to the electronic media device when the user input command was received;
   detecting a position of the remote control in the multiple images;
   determining a position of each of the one or more users in the multiple images;
   comparing the position of the remote control to the position of each of the one or more users;
   based on the comparison, detecting the user using the remote control;
   determining an identity of the user using the remote control based on the one or more images; and
      associating the user input command with the identified user using the remote control when the user input command was received.

11. The computer-implemented method of claim 10 wherein accessing personalized media settings associated with the user based on the determined identity comprises accessing personalized media settings associated with the identified user using the remote control when the user input command was received.

12. The computer-implemented method of claim 10 wherein detecting the position of the remote control in the multiple images includes detecting presence of infrared light in a first of the multiple images and detecting absence of infrared light in a second of the multiple images.

13. The computer-implemented method of claim 10 wherein:
   accessing multiple images of one or more users includes accessing multiple images of multiple users;
   detecting the user using the remote control includes determining which of the multiple users is closest to the position of the remote control; and
   associating the user input command with the identified user using the remote control when the user input command was received includes associating the user input command only with the identified user using the remote control when the user input command was received.

14. The computer-implemented method of claim 10 wherein the user input command is related to media settings, further comprising:
   storing personalized media settings for the identified user using the remote control when the user input command was received based on the user input command, wherein:
      determining the identity of the user detected within the image of the area proximate to the electronic media device includes determining that the user is the identified user using the remote control when the user input command was received; and
      accessing personalized media settings associated with the user based on the determined identity includes accessing the stored personalized media settings for the identified user using the remote control when the user input command was received.

15. The computer-implemented method of claim 14 wherein:
   receiving the user input command that is related to media settings and that is provided by the user using the remote control includes receiving a user input command to perform an operation including at least one of recording a particular television program, adding a particular television channel as a favorite channel, and adding a particular song to a play list; and
   storing personalized media settings for the identified user using the remote control when the user input command was received based on the user input command includes at least one of storing the particular television program in a list of recordings associated with the user using the remote control when the user input command was received, storing the particular television channel in a list of favorite channels associated with the user using the remote control when the user input command was received, and storing the particular song in a play list associated with the user using the remote control when the user input command was received.

16. The computer-implemented method of claim 1 further comprising:
   detecting multiple users in the image, wherein:
      determining the identity of the user based on the one or more accessed images includes determining an identity for at least one of the multiple users;
      accessing personalized media settings associated with the user based on the determined identity includes accessing personalized media settings associated with each of the multiple users based on the determined identities of the multiple users; and
      controlling the electronic media device based on the accessed personalized media settings includes:
         determining combined media settings based on the accessed personalized media settings associated with each of the multiple users; and
         controlling the electronic media device based on the combined media settings.

17. The computer-implemented method of claim 16 wherein:
   accessing personalized media settings associated with each of the multiple users based on the determined identities of the multiple users includes accessing a list of media choices for each of the multiple users; and
   determining combined media settings based on the accessed personalized media settings associated with each of the multiple users includes determining a combined list of media choices based on the lists of media choices for each of the multiple users, the combined list of media choices including at least one of a combined favorite channels list, a combined recordings list, and a combined music playlist.

18. The computer-implemented method of claim 17 wherein determining the combined list of media choices based on the lists of media choices for each of the multiple users includes:
   identifying media choices included on any one of the lists of media choices for each of the multiple users; and
   generating a combined list of media choices based on the identified media choices.

19. The computer-implemented method of claim 18 wherein generating the combined list of media choices based on the identified media choices includes:
   identifying media choices marked as private; and
   excluding the media choices marked as private from the combined list of media choices.

20. The computer-implemented method of claim 17 wherein determining the combined list of media choices based on the lists of media choices for each of the multiple users includes:
identifying media choices included on all of the lists of media choices for each of the multiple users; and
generating a combined list of media choices based on the identified media choices.

21. The computer-implemented method of claim 16 wherein determining combined media settings based on the accessed personalized media settings associated with each of the multiple users includes:
determining a position of each of the multiple users;
selecting a subset of the multiple users based on the determined positions of each of the multiple users, the subset of the multiple users being less than all of the multiple users; and
determining combined media settings based on the accessed personalized media settings associated with each of the users included in the subset of the multiple users without regard for the personalized media settings associated with the users that are included in the multiple users and that are not included in the subset of the multiple users.

22. The computer-implemented method of claim 1 further comprising:
detecting the user entering an area proximate to the electronic media device based on the image,
wherein controlling the electronic media device based on the accessed personalized media settings associated with the user includes triggering, without human intervention, the electronic media device to perform a personalized operation in response to detecting the user entering the area proximate to the electronic media device.

23. The computer-implemented method of claim 22 wherein triggering, without human intervention, the electronic media device to perform the personalized operation includes triggering, without human intervention, the electronic media device to change a content channel currently being experienced to a personalized content channel associated with the detected user based on the accessed personalized media settings associated with the user.

24. The computer-implemented method of claim 1 wherein determining the identity of the user detected within the image of the area proximate to the electronic media device includes:
identifying a region of interest within the image, the region of interest being less than the entire image and being a region in which users using the electronic media device are expected to be located; and
detecting the user in the region of interest.

25. The computer implemented method of claim 1, wherein the image includes a face of the user, and wherein the method further comprises:
filtering the face in the image to distinguish between the user and a photograph of the user.

26. A system comprising:
a camera configured to capture one or more images of an area proximate to an electronic media device;
a processor configured to perform operations comprising:
determining an identity of a user detected within the one or more images of the area proximate to the electronic media device based at least in part on a stored representation of an appearance of the user;
updating the stored representation of the appearance of the user if a degree of similarity of a current appearance of the user to the stored representation is less than a threshold value;
accessing personalized media settings associated with the user based on the determined identity; and
controlling the electronic media device based on the accessed personalized media settings, wherein
a face in the one or more images is ignored based on the face being smaller than a predefined size threshold if the stored representation of the appearance comprises the face.

27. A non-transitory computer readable storage medium having encoded thereon a computer program, the computer program comprising instructions for:
determining an identity of a user detected within an image of an area proximate to an electronic media device, based at least in part on a stored representation of an appearance of the user;
updating the stored representation of the appearance of the user if a degree of similarity of a current appearance of the user to the stored representation is less than a threshold value;
accessing personalized media settings associated with the user based on the determined identity; and
controlling the electronic media device based on the accessed personalized media settings, wherein
a face in the image is ignored based on the face being smaller than a predefined size threshold if the stored representation of the appearance comprises the face.

28. An apparatus comprising:
means for determining an identity of a user detected within an image of an area proximate to an electronic media device, based at least in part on a stored representation of an appearance of the user;
means for updating the stored representation of the appearance of the user if a degree of similarity of a current appearance of the user to the stored representation is less than a threshold value;
means for accessing personalized media settings associated with the user based on the determined identity; and
means for controlling the electronic media device based on the accessed personalized media settings, wherein
a face in the image is ignored based on the face being smaller than a predefined size threshold if the stored representation of the appearance comprises the face.

* * * * *